United States Patent
Kunjidhapatham et al.

(10) Patent No.: US 12,368,525 B2
(45) Date of Patent: Jul. 22, 2025

(54) ORCHESTRATION CONTROL PROTOCOL

(71) Applicant: Infinera Corp., San Jose, CA (US)

(72) Inventors: Ashok Kunjidhapatham, Devarachikkanahalli (IN); Ashwini Kumar Bhat, Bangalore (IN); G J Raghavendra, Bangalore (IN); Anoop Rajan, Alappuzha District (IN); Nikhil Satyarthi, Yelahanka (IN)

(73) Assignee: Infinera Corp, San Jose, CA (US)

( * ) Notice: Subject to any disclaimer, the term of this patent is extended or adjusted under 35 U.S.C. 154(b) by 358 days.

(21) Appl. No.: 18/160,659

(22) Filed: Jan. 27, 2023

(65) Prior Publication Data
US 2023/0246726 A1 Aug. 3, 2023

Related U.S. Application Data

(60) Provisional application No. 63/305,758, filed on Feb. 2, 2022.

(51) Int. Cl.
*H04B 10/00* (2013.01)
*H04J 14/02* (2006.01)
*H04J 14/00* (2006.01)

(52) U.S. Cl.
CPC ...... *H04J 14/0227* (2013.01); *H04J 14/0206* (2013.01); *H04J 14/0212* (2013.01)

(58) Field of Classification Search
CPC ............... H04J 14/0226; H04J 14/0227; H04J 14/0241; H04J 14/0254; H04J 14/0256; H04J 14/0257; H04J 14/0267; H04J 14/0272; H04J 14/02762
See application file for complete search history.

(56) References Cited

U.S. PATENT DOCUMENTS

2002/0109879 A1* 8/2002 Wing So ............ H04Q 11/0005
398/58
2014/0334817 A1* 11/2014 Miedema ............ H04J 14/0267
398/48

* cited by examiner

*Primary Examiner* — Daniel G Dobson

(57) ABSTRACT

An optical network is herein described. The optical network comprises a fiber optic line, a first network element, and a second network element. The first network element comprises a first optical interface, a first processor, and a first memory storing first processor-executable instructions that cause the first processor to: activate one or more passband on the first optical interface, thereby enabling the first optical interface to transport one or more optical carrier on the one or more passband; and transmit an activation request indicative of a request to activate the one or more passband on a plurality of optical interfaces of a plurality of network elements. The second network element comprises a second optical interface, a second processor, and a second memory storing second processor-executable instructions that cause the second processor to: receive the activation request; and activate the one or more passband on the second optical interface.

20 Claims, 10 Drawing Sheets

ORCHESTRATION CONTROL PROTOCOL

CROSS REFERENCES

This application claims the benefit of U.S. Provisional Patent Application No. 63/305,758, which was filed on Feb. 2, 2022, the contents of which are incorporated herein by reference in their entirety.

GOVERNMENT RIGHTS IN THE INVENTION

Not Applicable.

BACKGROUND ART

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems.

C+L optical line systems may be susceptible to experiencing optical power transients during loading operations due to the Stimulated Raman Scattering (SRS) effect across the different frequency bands. The transfer of energy from the high-frequency C-band to the low-frequency L-band can lead to traffic drop on pre-existing services in one frequency band if there is a significant loading change in the other frequency band.

SUMMARY OF THE INVENTION

The problem of managing and/or eliminating optical power transients during loading operations may be solved by an orchestration control protocol (OCP) described herein. In one aspect, the present disclosure relates to an optical network, comprising: a fiber optic line; a head-end network element comprising a first optical interface coupled to the fiber optic line, a first processor, and a first non-transitory computer readable medium storing first processor-executable instructions that, when executed by the first processor, cause the first processor to: activate one or more passband on the first optical interface, thereby enabling the first optical interface to transport one or more optical carrier on the one or more passband on the fiber optic line; and transmit, via the first optical interface, an activation request downstream on the fiber optic line, the activation request identifying the one or more passband and being indicative of a request to activate the one or more passband on a plurality of optical interfaces of a plurality of network elements connected in series, thereby enabling the plurality of optical interfaces to transport the one or more optical carrier on the one or more passband on the fiber optic line; and a tail-end network element downstream from the head-end network element on the fiber optic line, the tail-end network element comprising a second optical interface coupled to the fiber optic line, a second processor, and a second non-transitory computer readable medium storing second processor-executable instructions that, when executed by the second processor, cause the second processor to: receive, via the second optical interface, the activation request from upstream on the fiber optic line; and activate the one or more passband on the second optical interface, thereby enabling the second optical interface to transport the one or more optical carrier on the one or more passband on the fiber optic line.

In another aspect, the present disclosure relates to an optical network, comprising: a fiber optic line; a head-end network element comprising a first optical interface coupled to the fiber optic line, a first processor, and a first non-transitory computer readable medium storing first processor-executable instructions that, when executed by the first processor, cause the first processor to: transmit, via the first optical interface, a deactivation request downstream on the fiber optic line, the deactivation request identifying one or more passband and being indicative of a request to deactivate the one or more passband on a plurality of optical interfaces of a plurality of network elements connected in series, thereby disabling the plurality of optical interfaces from transporting the one or more optical carrier on the one or more passband on the fiber optic line; a tail-end network element downstream from the head-end network element on the fiber optic line, the tail-end network element comprising a second optical interface coupled to the fiber optic line, a second processor, and a second non-transitory computer readable medium storing second processor-executable instructions that, when executed by the second processor, cause the second processor to: receive, via the second optical interface, the deactivation request from upstream on the fiber optic line; and deactivate the one or more passband on the second optical interface, thereby disabling the second optical interface from transporting the one or more optical carrier on the one or more passband on the fiber optic line.

In yet another aspect, the present disclosure relates to an optical network, comprising: a fiber optic line; and a first network element comprising a first optical interface coupled to the fiber optic line, a first processor, and a first non-transitory computer readable medium storing first processor-executable instructions that, when executed by the first processor, cause the first processor to: transmit, via the first optical interface, a generic message to a second network element neighboring the first network element on the fiber optic line; and receive, via the first optical interface, an acknowledgment of the generic message from the second network element; wherein the second network element comprises a second optical interface coupled to the fiber optic line, a second processor, and a second non-transitory computer readable medium storing second processor-executable instructions that, when executed by the second processor, cause the second processor to: receive, via the second optical interface, the generic message from the first network element; and responsive to receiving the generic message, transmit, via the second optical interface, the acknowledgment of the generic message to the first network element.

BRIEF DESCRIPTION OF THE DRAWINGS

The accompanying drawings, which are incorporated in and constitute a part of this specification, illustrate one or more embodiments described herein and, together with the description, explain these embodiments. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DESCRIPTION

Figure 1:
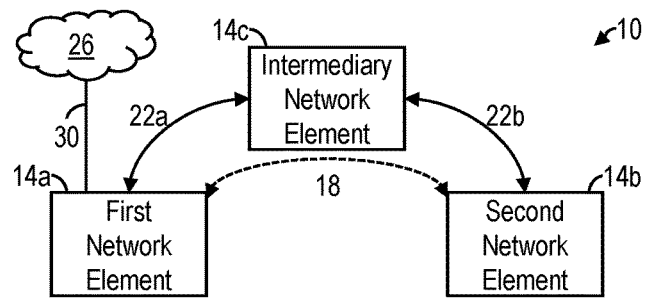
FIG. 1 is a block diagram of an exemplary embodiment of a transport network constructed in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Headings are provided for convenience only and are not to be construed to limit the invention in any manner. Embodiments illustrated under any heading or in any portion of the disclosure may be combined with embodiments illustrated under the same or any other heading or other portion of the disclosure. Any combination of the elements described herein in all possible variations thereof is encompassed by the invention unless otherwise indicated herein or otherwise clearly contradicted by context.

Unless otherwise required by context, singular terms shall include pluralities and plural terms shall include the singular, with the exception that the term "plurality" as used herein, does not include the singular.

All patents or published patent applications referenced in any portion of this application are herein expressly incorporated by reference in their entirety to the same extent as if each individual patent or publication was specifically and individually indicated to be incorporated by reference.

All of the assemblies, systems, kits, and/or methods disclosed herein can be made and executed without undue experimentation in light of the present disclosure. Where a method claim does not specifically state in the claims or description that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." The term "plurality" refers to "two or more."

The use of the term "at least one" will be understood to include one as well as any quantity more than one. In addition, the use of the term "at least one of X, Y, and Z" will be understood to include X alone, Y alone, and Z alone, as well as any combination of X, Y, and Z.

The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive.

Circuitry, as used herein, may be analog and/or digital components, or one or more suitably programmed processors (e.g., microprocessors) and associated hardware and software, or hardwired logic. Also, circuitry may include functional "blocks" that may perform one or more functions. The terms "block" or "component" may include hardware, such as a processor (e.g., microprocessor), and application specific integrated circuit (ASIC), field programmable gate array (FPGA), a combination of hardware and software, and/or the like. The term "processor" as used herein means a single processor or multiple processors working independently or together to collectively perform a task.

The term "optical carrier", also referred to as a "network media channel (NMC)", means an optical signal at a defined particular wavelength corresponding to an optical channel.

The term "passband", also referred to as a "media channel (MC)" or an "optical channel", is commonly used by those skilled in the art to mean a defined particular wavelength (frequency). Data can be imposed on the passband by encoding data into an optical carrier at the defined particular wavelength. Encoding data can be accomplished by varying signal strength, varying the base frequency, varying the wave phase, and/or other means.

Referring now to the drawings, and in particular to FIG. 1, shown therein is a diagram of an exemplary embodiment of a transport network 10 constructed in accordance with the present disclosure. The transport network 10 is depicted as comprising a plurality of network elements 14a-n. In general, the network elements 14a-n may be implemented in a variety of ways. Nonexclusive examples include optical line terminals (OLTs), optical cross connects (OXCs), optical line amplifiers (OAs), optical add/drop multiplexer (OADMs), reconfigurable optical add/drop multiplexers (ROADMs) and/or Flexible ROADM Modules (FRMS), interconnected by way of intermediate links. OLTs may be used at either end of a connection or intermediate link. OADM/ROADMs may be used to add, terminate and/or reroute wavelengths or fractions of wavelengths. Network elements (also referred to as "optical nodes") are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

As shown in FIG. 1, the network elements 14a-n may include, for example, a first network element 14a, a second network element 14b, and an intermediary network element 14c. Data transmitted within the transport network 10 from the first network element 14a to the second network element 14b may travel along an optical path 18 formed by a first fiber optic line 22a, the intermediary network element 14c, and a second fiber optic line 22b to the second network element 14b.

In some embodiments, a user may interact with a computer system 26 (e.g., via a user device (not shown)) that may be used to communicate with one or more of the network elements 14a-n via a communication network 30. In some embodiments, the computer system 26 (described in more detail below in reference to FIG. 2) may comprise components, such as a processor and a memory comprising a data store that may store data such as version information, firmware version information, sensor data, system data, metrics, logs, tracing, and the like in a raw format as well as transformed data that may be used for tasks such as reporting, visualization, analytics etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some embodiments, the computer system 26 is connected to one or more of the network elements 14a-n via the communication network 30. In this way, the computer system 26 may communicate with each of the network elements 14a-n, and may, via the communication network 30, transmit or receive data from each of the network elements 14a-n. In other embodiments, the computer system 26 may be integrated into each of the network elements 14a-n and/or may communicate with one or more pluggable card within each of the network elements 14a-n. In some embodiments, the computer system 26 may be integrated within one of the pluggable cards of the network elements 14a-n themselves. In some embodiments, the computer system 26 may be one of the network elements 14a-n separated from the transport network 10.

The communication network 30 may be almost any type of network. For example, in some embodiments, the communication network 30 may be a version of an Internet network (e.g., a TCP/IP-based network). In some embodiments, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

If the communication network 30 is the Internet, a primary user interface of the computer system 26 may be delivered through a series of web pages or private internal web pages of a company or corporation, which may be written in hypertext markup language, JavaScript, or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one embodiment, the communication network 30 may be connected to one or more of the user device, the computer system 26, and the network elements 14a-n.

The transport network 10 may be considered as a graph made up of interconnected individual network elements 14a-n. The transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical networks.

The optical signals carried on the fiber optic lines 22 may deteriorate as they travel over long distances. Accordingly, disposed on one or more of the fiber optic lines 22a and 22b may be an OA operable to amplify the optical signals carried on the fiber optic lines 22 in substantially all of the C- and L-bands. Each of the one or more OA may be, for example, an Erbium-Doped Fiber Amplifier (EDFA) or a Raman amplifier. Each of the one or more OA may contain one or more Variable Optical Attenuator (VOA) (not shown) through which the power levels may be controlled. The amplifier gain itself may be adjustable by a line amplifier or link control block.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the computer system 26 may interconnect via wired connections, wireless connections, or a combination thereof. For example, in one embodiment, the user device (not shown) and the computer system 26 may be integrated into the same device, that is, the user device (not shown) may perform functions and/or processes described as being performed by the computer system 26, described below in more detail.

Figure 2:
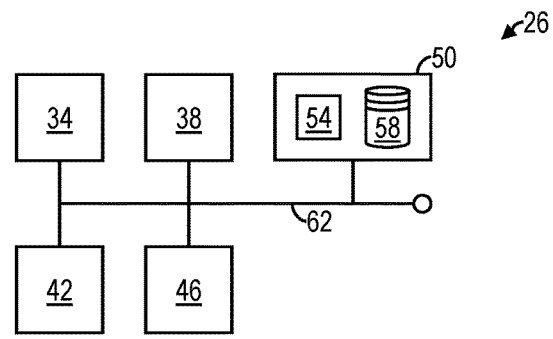
FIG. 2 is a block diagram of an exemplary embodiment of a computer system shown in FIG. 1.

Referring now to FIG. 2, shown therein is a diagram of an exemplary embodiment of the computer system 26 shown in FIG. 1. The computer system 26 may include, but is not limited to, embodiments as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 26 may include one or more input device 34 (hereinafter "input device 34"), one or more output device 38 (hereinafter "output device 38"), one or more processor 42 (hereinafter "processor 42"), one or more communication device 46 (hereinafter "communication device 46") capable of interfacing with the communication network 30, one or more non-transitory computer readable medium 50 (hereinafter "memory 50") storing processor-executable code 54 (hereinafter, the "software applications 54") and a database 58, for example including, a web browser capable of accessing a website and/or communicating information and/or data over a wireless or wired network (e.g., the communication network 30), and/or the like. The software applications 54, when executed by the processor 42, may cause the processor 42 to perform one or more of the methods described herein. The input device 34, the output device 38, the processor 42, the communication device 46, and the memory 50 may be connected via a path 62 such as a data bus that permits communication among the components of the computer system 26.

In some embodiments, the processor 42 may comprise one or more processor 42 working together, or independently, to read and/or execute processor executable code and/or data, such as stored in the memory 50. The processor 42 may be capable of creating, manipulating, retrieving, altering, and/or storing data structures into the memory 50. Each element of the computer system 26 may be partially or completely network-based or cloud-based, and may or may not be located in a single physical location.

Exemplary embodiments of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the network elements 14a-n via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol to provide information to the network elements 14a-n.

The memory 50 may store software applications 54 that, when executed by the processor 42, causes the computer system 26 to perform an action such as communicate with or control one or more component of the computer system 26, the transport network 10 (e.g., the network elements 14a-n) and/or the communication network 30.

In some embodiments, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first server memory 50 may be located in the same physical location as the processor 42, and additional server memory 50 may be located in a location physically remote from the processor 42. Additionally, the memory 50 may be implemented as a "cloud" non-transitory computer readable storage memory (i.e., one or more memory 50 may be partially or completely based on or accessed using the communication network 30).

The input device 34 may be capable of receiving information input from the user, another computer, and/or the processor 42, and transmitting such information to other components of the computer system 26 and/or the communication network 30. The input device 34 may include, but is not limited to, embodiment as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, embodiments of the output device 38 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and/or the like, for example. In some embodiments, the input device 34 and the output device 38 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

The communication network 30 may permit bi-directional communication of information and/or data between the computer system 26 and/or the network elements 14a-n of the transport network 10. The communication network 30 may interface with the computer system 26 and/or the network elements 14a-n in a variety of ways. For example, in some embodiments, the communication network 30 may interface by optical and/or electronic interfaces, and/or may use a plurality of network topographies and/or protocols including, but not limited to, Ethernet, TCP/IP, circuit switched path, combinations thereof, and/or the like. The communication network 30 may utilize a variety of network protocols to permit bi-directional interface and/or communication of data and/or information between the computer system 26 and/or the network elements 14a-n.

In some embodiments, the database 58 is a time-series database, a relational database, or a non-relational database. Examples of such databases include DB2®, Microsoft® Access, Microsoft® SQL Server, Oracle®, MySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 58 may be centralized or distributed across multiple systems.

Figure 3A:
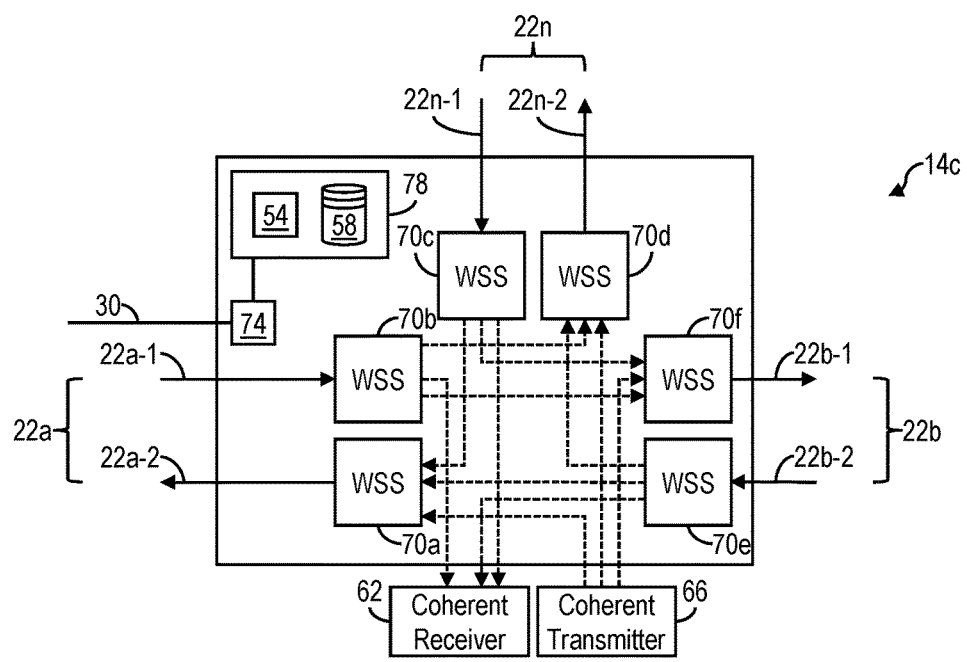
FIG. 3A is a block diagram of an exemplary embodiment of an intermediary network element shown in FIG. 1.

Referring now to FIG. 3A, shown therein is a diagram of the intermediary network element 14c shown in FIG. 1. In general, the network elements 14a-n transmit and receive data traffic and control signals. FIG. 3A illustrates an example of the intermediary network element 14c interconnecting the first fiber optic line 22a and the second fiber optic line 22b, as well as an nth fiber optic line 22n. Each of the network elements 14a-n (e.g., the first network element 14a and the second network element 14b) may be similar in construction and function as the intermediary network element 14c. For this reason, only the intermediary network element 14c will be described herein for purposes of brevity.

Each of the first fiber optic line 22a (shown herein as a first optical fiber line 22a-1 and a second optical fiber line 22a-2), the second fiber optic line 22b (shown herein as a first optical fiber line 22b-1 and a second optical fiber line 22b-2), and the nth fiber optic line 22n (shown herein as a first optical fiber line 22n-1 and a second optical fiber line 22n-2) may include optical fiber pairs, wherein each optical fiber of the pair carries optical signal groups propagating in opposite directions. As seen in FIG. 3A, for example, the first fiber optic line 22a includes the first optical fiber line 22a-1, which carries optical signals toward the intermediary network element 14c, and the second optical fiber line 22a-2 that carries optical signals output from the intermediary network element 14c. Similarly, the nth fiber optic line 22n may include the first optical fiber line 22n-1 and the second optical fiber line 22n-2 carrying optical signal groups to and from the intermediary network element 14c, respectively. Further, the second fiber optic line 22b may include the first optical fiber line 22b-1 and the second optical fiber line 22b-2 also carrying optical signals from and to the intermediary network element 14c, respectively. Additional network elements 14a-n, not shown in FIG. 3A, may be provided that supply optical signal groups to and receive optical signal groups from the intermediary network element 14c. Such network elements 14a-n may comprise network elements 14a-n having the same or similar structure as that of the intermediary network element 14c.

As shown in FIG. 3A, a coherent receiver 62 (described in more detail below in reference to FIG. 3B) and a coherent transmitter 66 (described in more detail below in reference to FIG. 3C) may be provided and in communication with the intermediary network element 14c to drop and add optical signal groups, respectively. As further shown in FIG. 3A, the intermediary network element 14c may include a plurality of WSS modules 70, such as WSS modules 70a-f. Wavelength selective switches are known components that can dynamically route, block and/or attenuate received optical signal groups input from and output to the fiber optic lines 22a-n. In addition to transmitting/receiving optical signal groups from these network elements, optical signal groups may also be input from or output to the coherent transmitter 66 and the coherent receiver 62, respectively.

As further shown in FIG. 3A, each of the WSS modules 70a-f can receive optical signal groups and selectively direct such optical signal groups to other WSS modules 70a-f for output from the intermediary network element 14c. For example, the WSS module 70b may receive optical signal groups on the first optical fiber line 22a-1 and supply certain optical signal groups to the WSS module 70f, while others are supplied to the WSS module 70d. Those supplied to the WSS module 70f may be output to one of the network elements 14a-n downstream from the intermediary network element 14c, such as the second network element 14b (shown in FIG. 1) on the first optical fiber line 22b-1, while those supplied to WSS module 70d may be output to another of the network elements 14a-n on the second optical fiber line 22n-2. Also, optical signal groups input to the intermediary network element 14c on the second optical fiber line 22b-2 may be supplied by WSS module 70e to either WSS module 70a and on to one of the network elements 14a-n upstream from the intermediary network element 14c, such as the first network element 14a (shown in FIG. 1) via the second optical fiber line 22a-2 or WSS module 70d and on to another of the network elements 14a-n via the second optical fiber line 22n-2. Moreover, WSS module 70c may selectively direct optical signal groups input to the intermediary network element 14c from the first optical fiber line 22n-1 to either WSS module 70a and onto the first network element 14a via the second optical fiber line 22a-2 or to WSS module 70f and onto the second network element 14b via the first optical fiber line 22b-1.

WSS modules 70a, 70c, and 70e may also selectively or controllably supply optical signal groups to the coherent receiver 62 and optical signal groups may be selectively output from the coherent transmitter 66 to the intermediary network element 14c. The optical signal groups output from the coherent transmitter 66 may be selectively supplied to one or more of WSS modules 70a, 70d, and 70f, for output on to the second optical fiber line 22a-2, the second optical fiber line 22n-2, and the first optical fiber line 22b-1, respectively.

As further shown in FIG. 3A, in some embodiments, the intermediary network element 14c further comprises a processor 74 and a memory 78 (i.e., a non-transitory computer readable medium) storing the software applications 54 and the database 58. The processor 74 and the memory 78 may be similar in construction and function as the processor 42 and the memory 50, respectively.

Figure 3B:
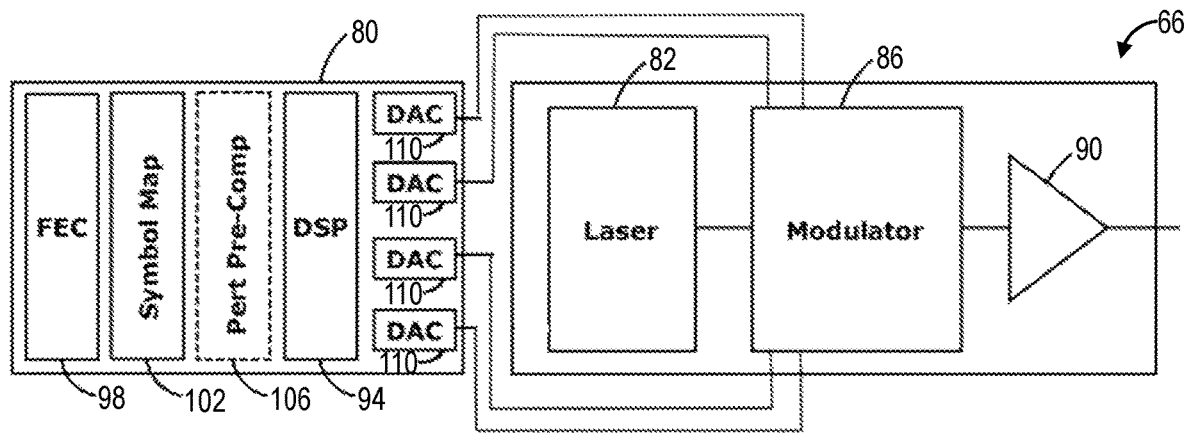
FIG. 3B is a block diagram of an exemplary embodiment of a coherent transmitter shown in FIG. 3A.

Referring now to FIG. 3B, shown therein is an exemplary embodiment of the coherent transmitter 66 shown in FIG. 3A. The coherent transmitter 66 may comprise one or more transmitter digital signal processor circuit 80, one or more laser 82, one or more modulator 86, one or more semiconductor optical amplifier 90, and/or other components (not shown).

The transmitter digital signal processor circuit 80 may have one or more transmitter digital signal processor (DSP) 94, Transmitter Forward Error Correction (FEC) circuitry 98, Symbol Map circuitry 102, transmitter perturbative pre-compensation circuitry 106, and digital-to-analogue converters (DAC) 110. The transmitter digital signal processor circuit 80 may be located in any one or more components of the coherent transmitter 66, or separate from the components, and/or in any location(s) among the components. The transmitter digital signal processor circuit 80 may be in the form of one or more Application Specific Integrated Circuit (ASIC), which may contain one or more module and/or custom module.

Processed electrical outputs from the transmitter digital signal processor circuit 80 may be supplied to the modulator 86 for encoding data into optical signals generated and supplied to the modulator 86 from the laser 82. The semiconductor optical amplifier 90 receives, amplifies, and transmits the optical signal including encoded data in the spectrum. Processed electrical outputs from the transmitter digital signal processor circuit 80 may be supplied to other circuitry in the transmitter digital signal processor circuit 80, for example, clock and data modification circuitry. The laser 82, modulator 86, and/or semiconductor optical amplifier 90 may be coupled with a tuning element (e.g., a heater) (not shown) that can be used to tune the wavelength of an optical channel output by the laser 82, modulator 86, or semiconductor optical amplifier 90. In some embodiments, a single laser 82 may be shared by multiple coherent transmitters 66.

Other possible components in the coherent transmitter 66 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the contents of which is hereby incorporated by reference in its entirety.

Figure 3C:
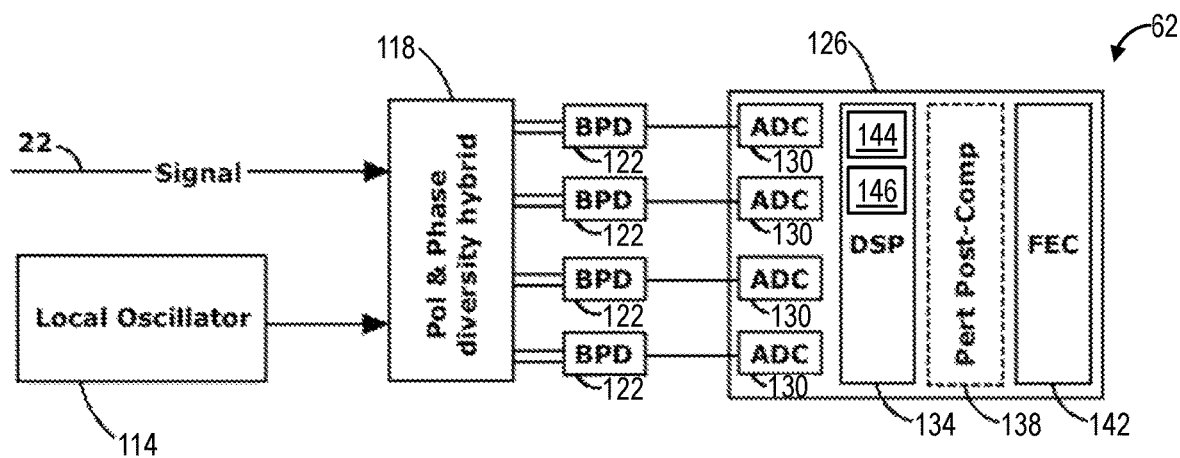
FIG. 3C is a block diagram of an exemplary embodiment of a coherent receiver shown in FIG. 3A.

Referring now to FIG. 3C, shown therein is an exemplary embodiment of the coherent receiver 62 shown in FIG. 3A. The coherent receiver 62 may comprise one or more local oscillator 114, a polarization and phase diversity hybrid circuit 118 receiving the one or more channel on the spectrum and the input from the local oscillator 114, one or more balanced photodiode 122 that produces electrical signals representative of the one or more channel on the spectrum, and one or more receiver processor circuit 126. Other possible components in the coherent receiver 62 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. In some embodiments, the coherent receiver 62 is a coherent receiver. The coherent receiver 62 may be implemented in other ways, as is well-known in the art. Exemplary embodiments of the coherent receiver 62 are further described in U.S. patent application Ser. No. 12/052,541, titled "Coherent Optical Receiver".

The one or more receiver processor circuit 126 may comprise one or more analog-to-digital converter (ADC) 130 receiving the electrical signals from the balanced photodiodes 122, one or more receiver digital signal processor (DSP) 134, receiver perturbative post-compensation circuitry 138, and receiver forward error correction (FEC) circuitry 142. The receiver FEC circuitry 142 may apply corrections to the data, as is well-known in the art. The one or more receiver processor circuit 126 and/or the one or more receiver DSP 134 may be located on one or more component of the coherent receiver 62 or separately from the components, and/or in any location(s) among the components. The receiver processor circuit 126 may be in the form of an Application Specific Integrated Circuit (ASIC), which may contain one or more module and/or custom module. In one embodiment, the receiver DSP 134 may include, or be in communication with, one or more processor 144 and one or more memory 146 storing processor readable instructions, such as software, or may be in communication with the processor 42 and the memory 50.

The one or more receiver DSP 134 receives and processes the electrical signals with multi-input-multiple-output (MIMO) circuitry, as described, for example, in U.S. Pat. No. 8,014,686, titled "Polarization demultiplexing optical receiver using polarization oversampling and electronic polarization tracking". Processed electrical outputs from receiver DSP 134 may be supplied to other circuitry in the receiver processor circuit 126, such as the receiver perturbative post-compensation circuitry 138 and the receiver FEC circuitry 142. Various components of the coherent receiver 62 may be provided or integrated, in one example, on a common substrate. Further integration is achieved by incorporating various optical de-multiplexer designs that are relatively compact and conserve space on the surface of the substrate.

In use, the one or more channel of the spectrum may be subjected to optical non-linear effects between the coherent transmitter 66 and the coherent receiver 62 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 106 and the receiver perturbative post-compensation circuitry 138. The amount of perturbation may be calculated using coefficients in algorithms and known or recovered transmitted data. The coefficients may be calculated, in accordance with U.S. Pat. No. 9,156,258 entitled "Subsea Optical Communication System Dual Polarization Idler" the contents of which are hereby incorporated by reference in its entirety, by use of analysis of one or more incoming channel at the coherent receiver 62.

In some embodiments, a predetermined channel of the spectrum, referred to herein as an Optical Supervisory Channel (OSC) 172 (shown in FIG. 3D), is reserved for transport of control messages (e.g., the PDUs described herein) among the network elements 14a-n of the transport network 10. The OSC 172 may be out-of-band (i.e., not in the C-band or the L-band).

Figure 3D:
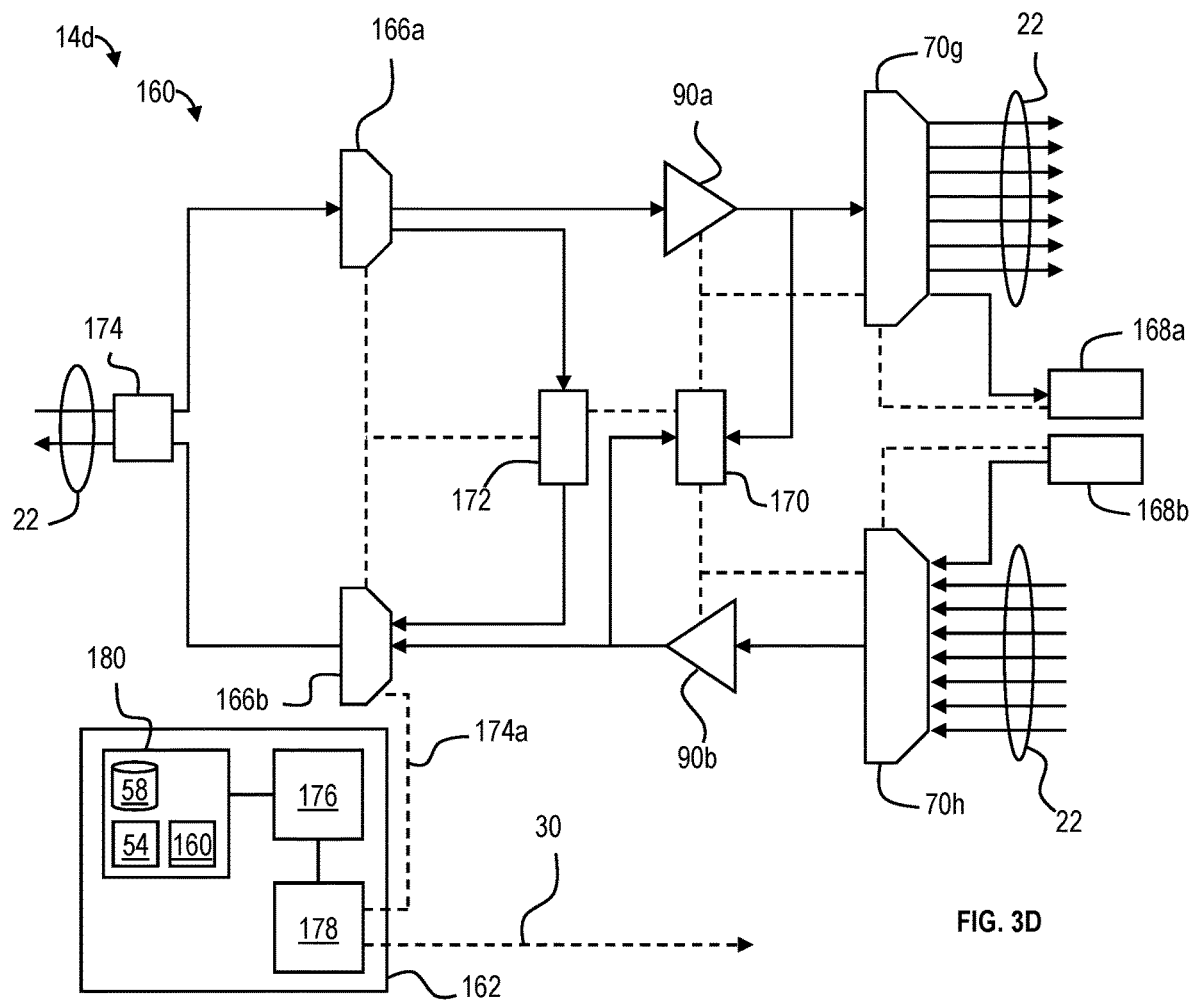
FIG. 3D is a block diagram of another exemplary embodiment of a network element constructed in accordance with the present disclosure.

Referring now to FIG. 3D, shown therein is a block diagram of another exemplary embodiment of a network element 14d of the transport network 10. FIG. 3D depicts an embodiment in which the network element 14d is an FRM 160 (hereinafter, the "FRM 160"). The FRM 160 may be provided with a controller 164, an input filter 166a, an output filter 166b, an input amplifier 90a, an output amplifier 90b, an output WSS 70g, an input WSS 70h, at least one add transceiver 168a (hereinafter "add transceiver 168a"), at least one drop transceiver 168b (hereinafter "drop transceiver 168b"), an optical channel monitor (OCM) 170, an OSC 172, and one or more interface 174. It should be noted that the elements of FRM 160 are shown for illustration purposes only and should not be considered limiting. For instance, the illustrated FRM 160 is one possible realization of a single degree of a ROADM.

In some embodiments, the add transceiver 168a and the drop receiver 168b may be implemented as a line card having multiple add and drop transceivers and may be configured to service channels across multiple ROADM degrees. In other embodiments, the add transceiver 168a is a coherent transmitter 66 and the drop transceiver 168b is a coherent receiver 62.

The OCM 170 provides the ability to monitor a power level of each wavelength. This information can then be used by the controller 164 to attenuate each wavelength with the output WSS 70g and/or the input WSS 70h at ROADM sites or dynamic gain equalization (DGE) at OA sites in order to optimize the power level of each wavelength. The OCM 170 can also be used to troubleshoot the transport network 10. Coherent OCMs offer sub-GHz accuracy and highly accurate power monitoring of fine spectral slices independent of adjacent channel power. They reduce the C-band scanning time from seconds to hundreds of milliseconds. And they provide advanced processing of spectral characteristics, such as valid channel detection, center wavelength, and optical signal-to-noise ratio (OSNR).

The OSC 172 provides a communication channel between adjacent network elements, such as the first network element 14a and the intermediary network element 14c, or the intermediary network element 14c and the second network element 14b, that can be used for functions including link control, in-band management, control plane (i.e., ASON/GMPLS), span loss measurement, and neighbor discovery. Information about the physical properties of the fiber optic line 22 (fiber types, loss, amplifier types, etc.) downstream from the FRM 160 can be communicated to the controller 164 via the OSC 172.

The interface 174 may be a physical port or a software port through which data is exchanged with a neighboring network element. For instance, the interface 174 is illustrated a port though which data may be transmitted and/or received over a fiber optic line 22.

The FRM 160 is illustrated with the controller 164 for controlling the elements of the FRM 160. The FRM 160 may be provided with an interface 174a that connects the controller 164 to the elements of the FRM 160. The controller 164 may be a microcontroller, for instance, that is provided with a processor 176, a communication device 178, and non-transitory computer readable memory 180 (hereinafter, the "memory 180"). The controller 164 may perform tasks including the functions related to OCP described herein. The memory 180 may store executable code, such as the software applications 54, and/or the database 58. The processor 176 and the memory 180 may be similar in construction and function as the processor 42 and the memory 50, respectively.

The number of devices illustrated in FIG. 3D are provided for explanatory purposes. In practice, there may be additional devices, fewer devices, different devices, or differently arranged devices than are shown in FIG. 3D. Furthermore, two or more of the devices illustrated in FIG. 3D may be implemented within a single device, or a single device illustrated in FIG. 3D may be implemented as multiple, distributed devices. Additionally, one or more of the devices illustrated in FIG. 3D may perform one or more functions described as being performed by another one or more of the devices illustrated in FIG. 3D. Devices illustrated in FIG. 3D may interconnect via wired connections (e.g., fiber-optic connections).

Figure 4:
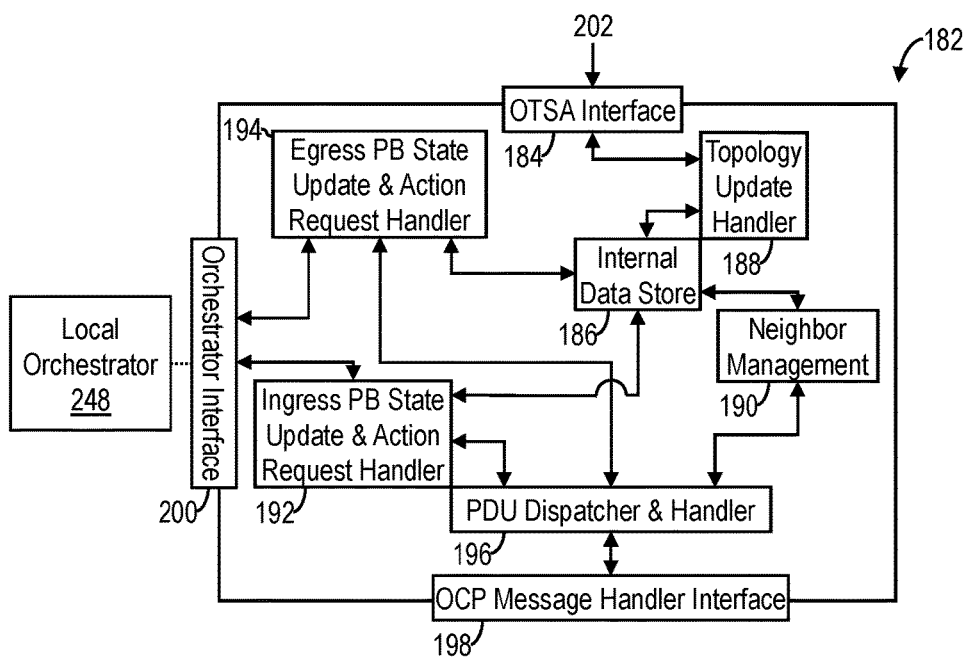
FIG. 4 is a block diagram of an exemplary embodiment of functional blocks for implementing an orchestration control protocol constructed in accordance with the present disclosure.

Referring now to FIG. 4, shown therein is an exemplary embodiment of functional blocks for implementing an orchestration control protocol (OCP) 182 constructed in accordance with the present disclosure. As shown in FIG. 4, the OCP 182 may comprise a plurality of functional "blocks", including an optical topology and switching abstraction (OTSA) interface 184, an internal data store (IDS) 186, a topology update handler (TUH) 188, a neighbor manager (NM) 190, an ingress passband state update and action request handler 192 (hereinafter, the "ingress pipeline 192"), an egress passband state update and action request handler 194 (hereinafter, the "egress pipeline 194"), a protocol data unit (PDU) dispatcher and handler 196, an OCP message handler interface 198, and an orchestrator interface 200.

The OCP 182 and each of the functional blocks thereof may be one or more of the software applications 54. In some embodiments, the software applications 54 are stored at the level of a network element 14 (i.e., in the memory 78 of a network element 14). This configuration may be referred to as a "node-level", "network element-level", or "ROADM-level" deployment of the OCP 182, each network element 14 storing an "instance" of the OCP 182.

In some embodiments, the software applications 54 are stored at the level of an FRM 160 (i.e., in the memory 180 of an FRM 160). This configuration may be referred to as a "degree-level" deployment of the OCP 182. The OCP 182 may treat each FRM 160a-n of an express network element 14 (i.e., a network element 14 comprising a plurality of FRMs 160a-n at which one or more PB is to be transported from one line interface 218 to another line interface 218, such as the intermediary network element 14i shown in FIG. 10B) as a discrete virtual network element 14, each FRM 160a-n storing an "instance" of the OCP 182. Accordingly, while the OCP 182 is described herein as operating on the network elements 14a-n, it will be understood by persons having ordinary skill in the art that the OCP 182 may operate on each of the FRMs 160a-n of an express network element 14 as discrete virtual network elements 14a-n. The discrete virtual network elements 14a-n may be connected to each other by an express link 302 (shown in FIG. 10B), though in such embodiments, the express link 302 connecting the FRMs 160a-n may be similar in form and function to the fiber optic lines 22 connecting the network elements 14a-n described elsewhere herein.

The OCP 182 may be based on a data-driven model. Accordingly, the IDS 186 may be a central data store for the OCP 182. This may allow the functional blocks of the OCP 182 to operate independently of each other while maintaining the same internal data model stored in the IDS 186. The internal data model may be based at least in part, for example, optical switching abstraction. The data stored in the IDS 186 may include configuration and state information for the functional blocks of the OCP 182.

Access to the data stored in the IDS 186 may be controlled by read-write locks and may be achieved through the use of application programming interfaces (APIs), for example. Other functional blocks of the OCP 182 may "subscribe" to particular data such that any changes in the data may cause a notification to be transmitted to the subscribed functional blocks. As described herein, the functional blocks of the OCP 182 may be configured to react in a number of ways to the change in the data. In some embodiments, the IDS 186 is stored completely in memory (i.e., non-persistent). In such embodiments, the data stored in the IDS 186 may be re-learnt from each of the functional blocks of the OCP 182 when the OCP 182 is restarted.

The TUH 188 may receive logical topology abstraction information and/or updates 202 via the OTSA interface 184. The TUH 188 may store the logical topology abstraction information and/or updates 202 in the IDS 186. Each of the functional blocks of the OCP 182 may have circuitry to register the functional block with the IDS 186 (or subscribe the functional block to the IDS 186) to receive updates for one or more dataset stored in the IDS 186. The IDS 186, in turn, may send a notification to the registered (or subscribed) functional block when the dataset stored in the IDS 186 is updated by the TUH 188. The dataset may be a group of related or homogenous data (i.e., an entity set).

In some embodiments, the OTSA interface 184 sends the notification to the registered functional block, and upon receiving such notification, the registered functional block may retrieve the changed data via the OTSA interface 184 using, for example, an API provided by the OTSA interface 184. The TUH 188 may pull the changes from the OTSA interface 184 and may apply the changes on the data stored in the IDS 186. In some embodiments, upon a restart of the OCP 182, the TUH 188 pulls the logical topology abstraction information from the OTSA interface 184 and stores the information in the IDS 186.

The NM 190 of, for example, a local network element 14*e* of the transport network 10 may establish and maintain adjacency relationships with one or more neighboring network element 14*f* (shown in FIG. 7) (hereinafter, the "neighboring network element(s) 14*f*") using a neighbor finite state machine (FSM) 246 (shown in FIG. 6), which is discussed further below. While the local network element 14*e* and the neighboring network elements 14*f* are described herein as network elements 14*a-n*, in embodiments where the OCP 182 is deployed at a "degree-level", each of the local network element 14*e* and the neighboring network elements 14*f* may be an FRM 160.

Figure 7:
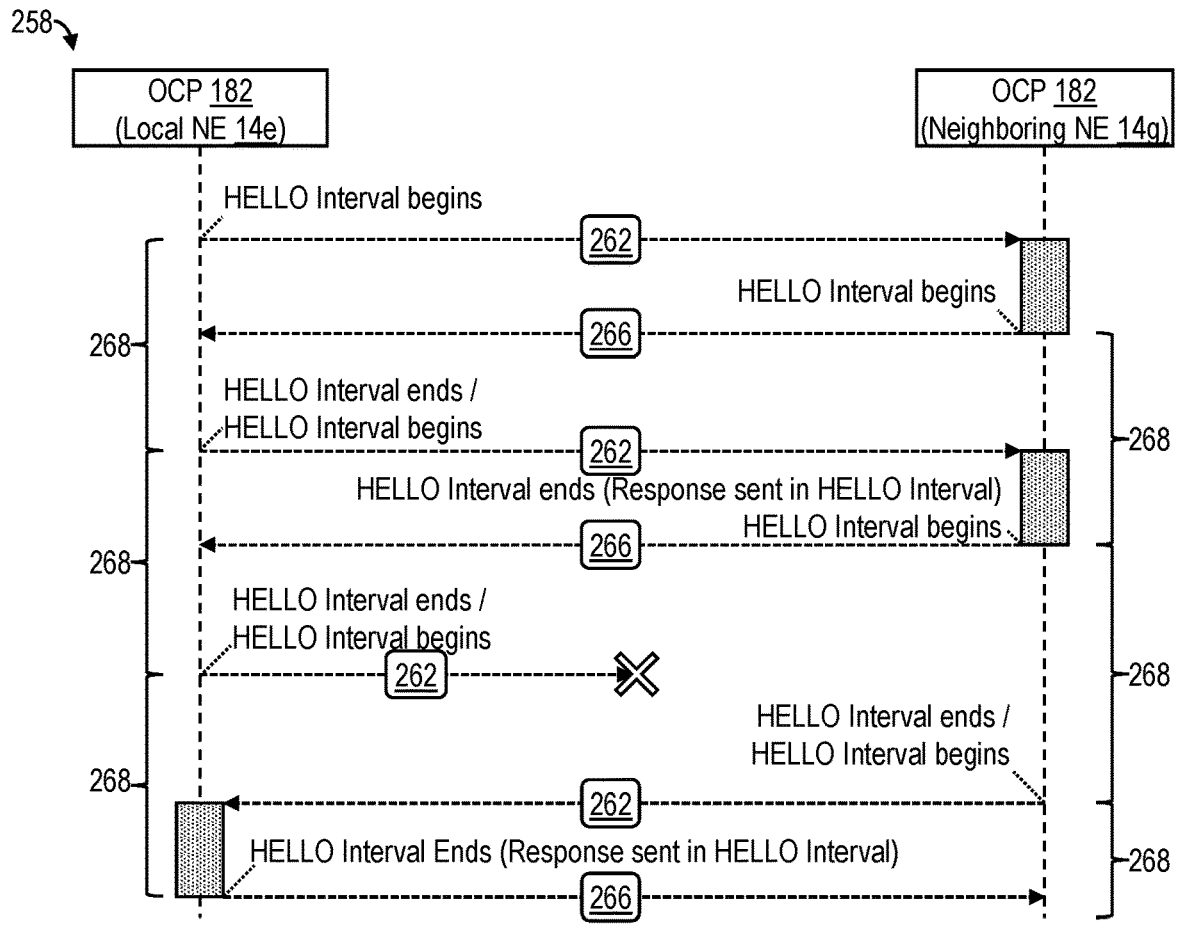
FIG. 7 is a sequence diagram of an exemplary embodiment of a HELLO Protocol Data Unit (PDU) exchange for establishing and/or maintaining a two-way adjacency relationship between a local network element and a neighboring network element constructed in accordance with the present disclosure.

The functions of the NM 190 may include: exchanging HELLO PDUs 262 or 266 (shown in FIG. 7 and described further below) with the neighboring network elements 14*f*, thereby establishing two-way associations between the local network element 14*e* and the neighboring network elements 14*f*; periodically exchanging HELLO PDUs 262 or 266 (shown in FIG. 7) and refreshing passband (PB) states; detecting losses of communication with neighboring network elements 14*f* and tearing down the two-way associations between the local network element 14*e* and the neighboring network elements 14*f* when consecutive HELLO requests 262 (shown in FIG. 7 and described further below) are not replied to for a predetermined period of time; detecting when a neighboring network element 14*f* is restarted and assisting the neighboring network element 14*f* in its recovery by resynchronizing states; and, when no connections are active on an interface, tearing down the two-way associations between the local network element 14*e* and the neighboring network elements 14*f* by shutting down origination of HELLO PDUs 262 or 266 (shown in FIG. 7).

As discussed further below, the ingress pipeline 192 may manage state updates and/or action requests pertaining to the PBs in an ingress direction (i.e., received from an orchestrator of an upstream neighboring network element 14*f*). The ingress pipeline 192 may forward the state updates and/or action requests to a local orchestrator 248 via the orchestrator interface 200. Further, the ingress pipeline 192 may be responsible for enforcing reliability of PDUs bound to the ingress pipeline 192.

As discussed further below, the egress pipeline 194 may manage state updates and/or action requests pertaining to the PBs in an egress direction (i.e., received from the local orchestrator 248 via the orchestrator interface 200). The egress pipeline 194 may forward the state updates and/or action requests to an orchestrator 248 of a neighboring network element 14*f*. Further, the egress pipeline 194 may be responsible for enforcing reliability of PDUs bound to the egress pipeline 194.

The PDU dispatcher and handler 196 may serialize PDU data and transmit the serialized data as a raw message buffer to the OCP message handler interface 198. Further, the PDU dispatcher and handler 196 may deserialize raw message buffers received from the OCP message handler interface 198 and transmit the deserialized data as PDU data to one or more of the functional blocks described herein.

PDUs may be transmitted via the transport network 10 or the communication network 30. For example, the PDUs may be transmitted directly over the OSC 172, or over Ethernet or IP packets. In this example, because the transmission is point-to-point, the PDU dispatcher and handler 196 may use a multicast address to specify a destination. For example, the multicast address may be 239.0.0.51. Further, the PDU dispatcher and handler 196 may transmit the PDUs using the User Datagram Protocol (UDP) with a port number of, for example, 7203. In embodiments where the transport network 10 comprises one or more OA disposed on one or more of the fiber optic lines 22*a-n*, the OSC 172 may terminate at each of the one or more OA. Accordingly, each of the one or more OA may be provided with circuitry operable to perform a forwarding function to forward PDUs transparently (i.e., without any change) across the OA. The various types of PDUs and their descriptions are contained in Table 1 below.

TABLE 1

| PDU Types. | | | |
|---|---|---|---|
| ID | PDU Type | Top Level TLV ID | Description |
| 1 | HELLO_REQUEST | HELLO_REQUEST_TLV (1) | HELLO Request 262 |
| 2 | HELLO_RESPONSE | HELLO_RESPONSE_TLV (2) | HELLO Response 266 |

TABLE 1-continued

PDU Types.

| ID | PDU Type | Top Level TLV ID | Description |
|---|---|---|---|
| 3 | ACTIVATION_REQUEST | ACTIVATION_REQUEST_TLV (3) | Activation Request 310 |
| 4 | ACTIVATION_ACK | ACTIVATION_ACK_TLV (4) | Activation Acknowledgment 314 |
| 5 | ACTIVATION_STATUS | ACTIVATION_STATUS_TLV (5) | Activation Status 318 |
| 6 | DEACTIVATION_REQUEST | DEACTIVATION_REQUEST_TLV (6) | Deactivation Request 330 |
| 7 | DEACTIVATION_ACK | DEACTIVATION_ACK_TLV (7) | Deactivation Acknowledgment 334 |
| 8 | DEACTIVATION_STATUS | DEACTIVATION_STATUS_TLV (8) | Deactivation Status 338 |
| 9 | GENERIC_NOTIF | GENERIC_NOTIF_TLV (9) | Generic Notification 350 |
| 10 | GENERIC_NOTIF_ACK | GENERIC_NOTIF_ACK_TLV (10) | Generic Notification Acknowledgment 354 |
| 11 | GENERIC_ACTION | GENERIC_ACTIION_TLV (11) | Generic Action 350 |
| 12 | GENERIC_ACTION_ACK | GENERIC_ACTION_ACK_TLV (12) | Generic Action Acknowledgment 354 |
| 13 | REFRESH | REFRESH_TLV (13) | Refresh 286 |
| 14 | REFRESH_ACK | REFRESH_ACK_TLV (14) | Refresh Acknowledgment 290 |
| 15 | STATUS_ACK | STATUS_ACK_TLV (15) | Activation/Deactivation Status Acknowledgment 322 or 342 |

Figure 5A:
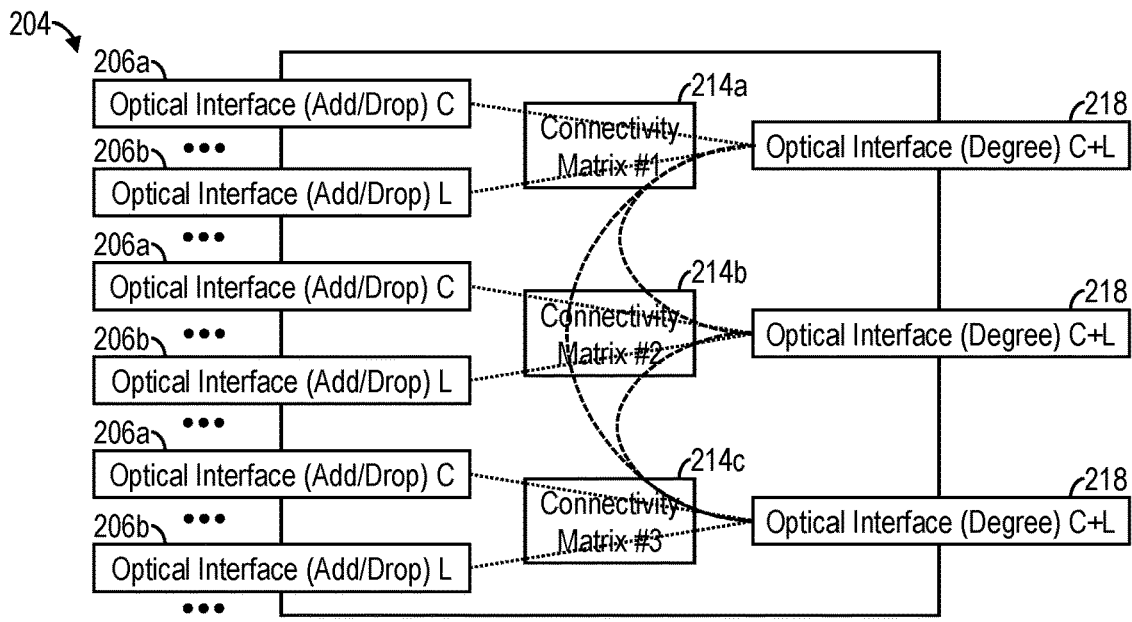
FIG. 5A is a block diagram of an exemplary embodiment of a logical Reconfigurable Optical Add-Drop Multiplexer (ROADM) abstraction constructed in accordance with the present disclosure.

Referring now to FIG. 5A, shown therein is a block diagram of an exemplary embodiment of an internal data model 204 maintained by the IDS 186. The internal data model 204 shown in FIG. 5A may be referred to as a logical abstraction of the local network element 14e (hereinafter, the "logical ROADM abstraction 204") in a "network element-level" deployment of the OCP 182. As discussed below, PB state information and action information may be modelled on top of the logical ROADM abstraction. As discussed above, the OTSA interface 184 may provide the logical ROADM abstraction to the OCP 182, and the OCP 182 models its internal data model on top of the logical ROADM abstraction.

A plurality of optical interfaces 206 or 218 may be connected to each other through one or more connectivity matrix 214 (e.g., a first connectivity matrix 214a, a second connectivity matrix 214b, and a third connectivity matrix 214c). The optical interfaces may include one or more add-drop (or "add/drop") interface 206 and/or one or more express interface 210a-n (shown in FIG. 5B). Each of such optical interfaces may be one of a C-band optical interface and an L-band optical interface. The internal data model 204 may further comprise one or more C+L-band (or "C/L-band") degree (or "line") interface 218 (hereinafter, the "line interfaces 218"). The one or more express interface 210a-n may not be modelled in the logical ROADM abstraction 204. Instead, the line interfaces 218 may be connected to each other via the one or more connectivity matrix 214.

A logical ROADM abstraction may be identified by a numerical ROADM identifier. In some embodiments, the numerical ROADM identifier is 16 bytes in length and is a combination of a node or network element identifier being 12 bytes in length and an instance identifier being 4 bytes in length. Similarly, the optical interfaces 206, 210, or 218 may be identified by an optical interface identifier. In some embodiments, the optical interface identifier is 4 bytes in length. The ROADM identifier and the optical interface identifier may be based on the corresponding hardware (i.e., the local network element 14e and the optical interface), which may assist in facilitating debugging and correlation.

Figure 5B:
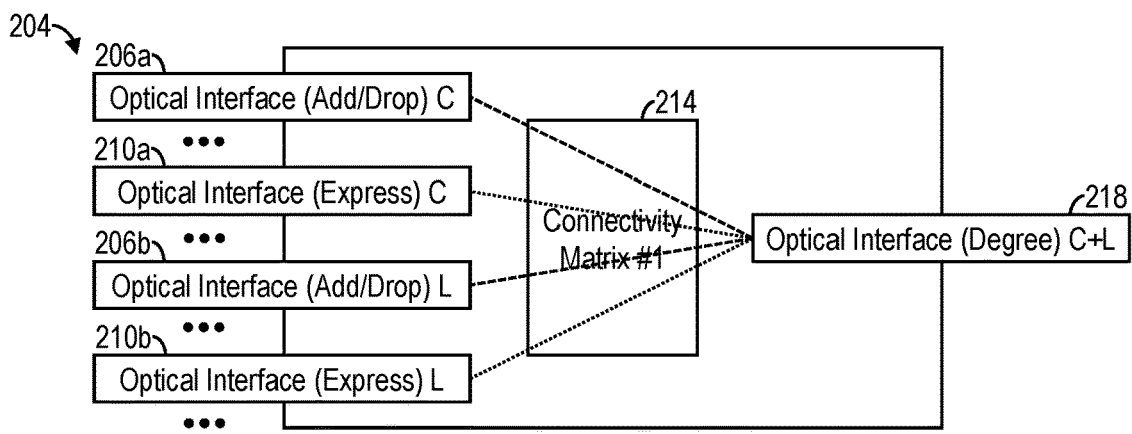
FIG. 5B is a block diagram of another exemplary embodiment of the logical ROADM abstraction shown in FIG. 5A.

Referring now to FIG. 5B, shown therein is a block diagram of another exemplary embodiment of the internal data model 204 shown in FIG. 5A. As shown in FIG. 5B, the internal data model 204 may be referred to as a logical abstraction of a ROADM at the level of a degree (hereinafter, the "logical degree abstraction") in a "degree-level" deployment of the OCP 182. Like the internal data model 204 shown in FIG. 5A, the plurality of optical interfaces 206, 210, or 218 may be connected to each other through the one or more connectivity matrix 214.

Figure 5C:
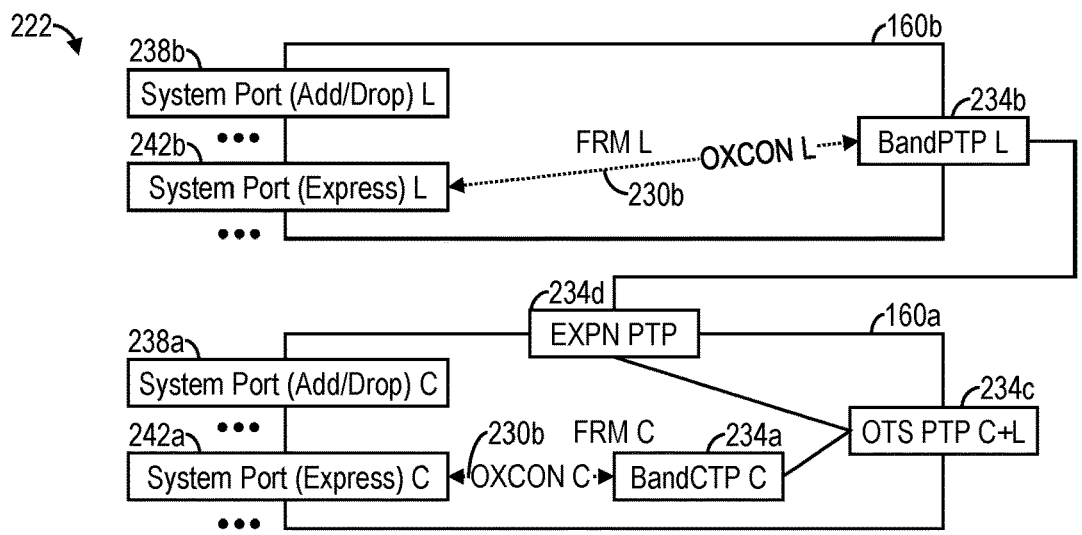
FIG. 5C is a block diagram of an exemplary embodiment of a physical equipment topology corresponding to the logical ROADM abstraction shown in FIGS. 5A-5B.

Referring now to FIG. 5C, shown therein is a physical equipment topology 222 corresponding to the logical ROADM abstraction of the internal data model 204 shown in FIG. 5A. The physical equipment topology 222 may include a C-band Flexible ROADM Module (FRM) 160a and an L-band FRM 160b connected via one or more Optical Cross-Connect (OXCON) 230 and/or Physical Termination Point (PTP) 234. The one or more OXCON 230 may comprise a C-band OXCON 230a and an L-band OXCON 230b. The one or more PTP 234 may include a C-band PTP 234a, an L-band PTP 234b, a C+L-band [ ] Optical Transmission Section (OTS) PTP 234c on the C-band FRM 160, and/or an Expansion (EXPN) PTP 234d.

The C-band FRM 160a may comprise a plurality of C-band system ports, which may include one or more C-band add-drop (or "add/drop") system port 238a and one or more C-band express system port 242a. The C-band FRM 160a may further comprise the C-band PTP 234a connected to one or more of the C-band system ports 238a or 242a (e.g., the C-band express system port 242a, as shown in FIG. 5C) via the C-band OXCON 230a. The C-band FRM 160a may further comprise the C+L-band OTS PTP 234c connected to the C-band PTP 234a and the EXPN PTP 234d.

The L-band FRM 160b may comprise a plurality of L-band system ports, which may include one or more L-band add-drop (or "add/drop") system port 238b and one or more L-band express system port 242b. The L-band FRM 160b may further comprise the L-band PTP 234b connected to one or more of the L-band system ports 238b or 242b (e.g., the L-band express system port 242b, as shown in FIG. 5C) via the L-band OXCON 230b. The L-band PTP 234b and the EXPN PTP 234*d* may be connected to each other to connect the C-band FRM 160*a* and the L-band FRM 160*b*. Therefore, the C+L-band OTS PTP 234*c* is connected to both of the C-band PTP 234*a* and the L-band PTP 234*b*.

As discussed above, neighbor management (i.e., functions performed by the NM 190) generally includes function associated with establishing and maintaining adjacency relationships with neighbors over each of the optical interfaces 206, 210, or 218. Key functions of the NM 190 may include: exchanging HELLO PDUs 262 or 266 (shown in FIG. 7 and discussed further below) with neighboring network elements 14*f*, thereby establishing two-way associations between the local network element 14*e* and the neighboring network elements 14*f* (i.e., adjacency establishment); periodically exchanging HELLO PDUs 262 or 266 (shown in FIG. 7 and discussed further below) and refreshing PB states (i.e., adjacency maintenance); detecting losses of communication with neighboring network elements 14*f* and tearing down the two-way associations between the local network element 14*e* and the neighboring network elements 14*f* when consecutive HELLO requests 262 are not replied to for a predetermined period of time (i.e., connectivity loss detection); detecting when a neighboring network element 14*f* is restarted and assisting the neighboring network element 14*f* in its recovery by resynchronizing states (i.e., aid neighbor recovery); and, when no connections are active on an optical interface 206, 210, or 218, tearing down the two-way associations between the local network element 14*e* and the neighboring network elements 14*f* by shutting down origination of HELLO PDUs 262 or 266 (shown in FIG. 7 and discussed further below) (i.e., adjacency teardown).

Figure 6:
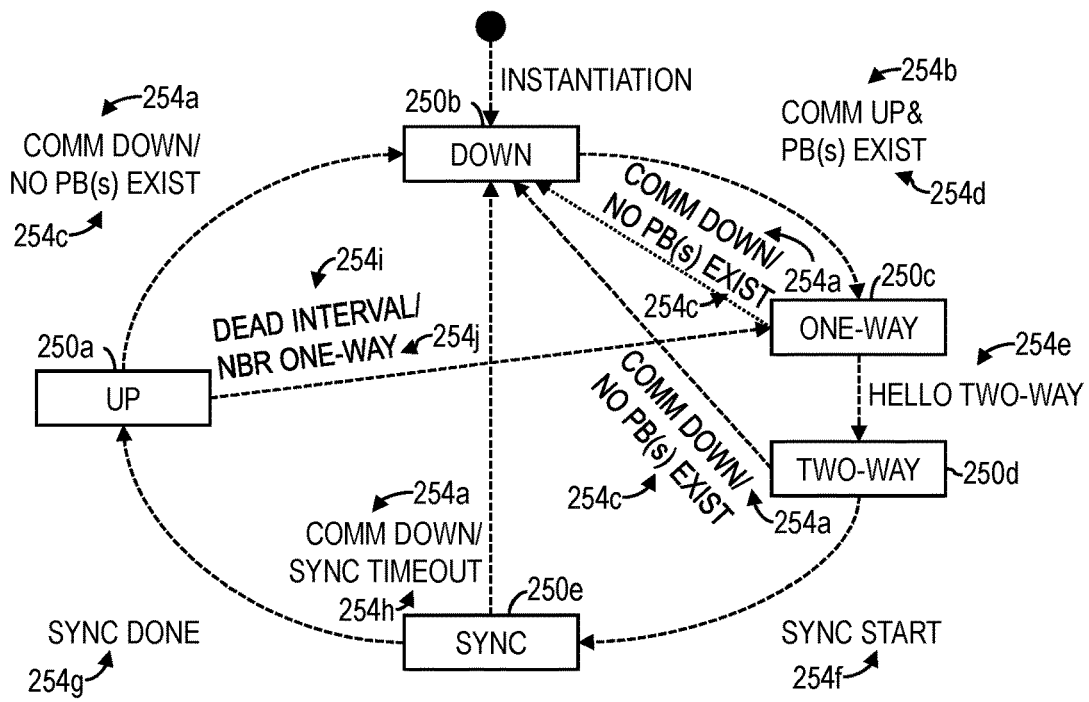
FIG. 6 is a state diagram of an exemplary embodiment of a neighbor finite state machine constructed in accordance with the present disclosure.

Referring now to FIG. 6, shown therein is a state diagram of an exemplary embodiment of a neighbor FSM 246. The neighbor FSM 246 may be instantiated and maintained for each of the optical interfaces 206, 210, or 218. The neighbor FSM 246 may be operable to transition between a plurality of states 250 based at least in part on the occurrence of a plurality of events 254. The states 250 may include an "UP" state 250*a*, a "DOWN" state 250*b*, a "ONE-WAY" state 250*c*, a "TWO-WAY" state 250*d*, and a "SYNC" state 250*e*. Descriptions of each of the states 250 are contained in Table 2 below.

TABLE 2

Neighbor FSM States.

| State | Description |
| --- | --- |
| UP (250a) | Adjacency of neighboring network elements 14f is fully UP. In this state, all steady-state messaging with neighboring network elements 14f is enabled. |
| DOWN (250b) | Either an associated communication channel is DOWN or no PB instance exists on the optical interface 206, 210, or 218. All steady-state messaging with neighboring network elements 14f is disabled. As discussed further below, this includes HELLO PDUs. |
| ONE-WAY (250c) | Either a HELLO request 262 has been sent from the local network element 14e or a HELLO request 262 has been received from a neighboring network element 14f. |
| TWO-WAY (250d) | TWO-WAY association with a neighboring network element 14f has been established. Preconditions are discussed further below. |
| SYNC (250e) | Synchronization of PB states is in progress. |

The events 254 may include a "COMM DOWN" event 254*a*, a "COMM UP" event 254*b*, a "NO PB(s) EXIST" event 254*c*, a "PB(s) EXIST" event 254*d*, a "HELLO TWO-WAY" event 254*e*, a "SYNC START" event 254*f*, a "SYNC DONE" event 254*g*, a "SYNC TIMEOUT" event 254*h*, a "DEAD INTERVAL" event 254*i*, a "NBR ONE-WAY" event 254*j*. Descriptions of each of the events 254 are contained in Table 3 below.

TABLE 3

Neighbor FSM Events.

| Event | Description |
| --- | --- |
| COMM DOWN (254a) | Status of associated communication channel is DOWN. |
| COMM UP (254b) | Status of associated communication channel is UP. |
| NO PB(s) EXIST (254c) | No PB instance exists on the optical interface 206, 210, or 218. |
| PB(s) EXIST (254d) | One or more PB instance exists on the optical interface 206, 210, or 218. |
| HELLO TWO-WAY (254e) | A HELLO PDU exchange 258 has reached a TWO-WAY state 250d. |
| SYNC START (254f) | Synchronization of PBs with a neighboring network element 14f has begun. |
| SYNC DONE (254g) | Synchronization of PBs with a neighboring network element 14f has been completed. |
| SYNC TIMEOUT (254h) | Synchronization of PBs with a neighboring network element 14f has timed out. No REFRESH acknowledgment 290 was received from the neighboring network element 14f within a predetermined time period. |
| DEAD INTERVAL (254i) | No HELLO response 266 was received for any HELLO request 262 for any HELLO interval 268 for a predetermined time period. |
| NBR ONE-WAY (254j) | The state of a neighboring network element 14f has transitioned to the ONE-WAY state 250c. |

PBs may be instantiated by the OCP 182 in response to a creation of a cross-connection. The orchestrator 248 of, for example, the local network element 14e, may update PB statuses in an ingress direction via the ingress pipeline 192 and PB states in an egress direction via the egress pipeline 194. The ingress pipeline 192 and the egress pipeline 194 may use such information to initiate one or more action and/or report the PB state or PB status to a neighboring network element 14f. Descriptions of each of the PB states are contained in Table 4 below.

TABLE 4

PB States.

| State | Description |
|---|---|
| DEACTIVATED | The PB is deactivated. |
| ACTIVATED | Activation of the PB is complete on the local network element 14e. |
| AWAITING_UPSTREAM_SYNC | Waiting for network element(s) 14a-n upstream to synchronize the PB state. |
| AWAITING_DOWNSTREAM_DEACTIVATION | Waiting for network element(s) 14a-n downstream to finish deactivation of PB. |
| FAULTED | PB is faulted due to a local fault condition. |

A PB status may indicate a current status of network element(s) 14a-n downstream. The PB status may be maintained by the OCP 182 on each of the network elements 14a-n and may be used by the OCP 182 for processing incoming requests and generating status messages. Descriptions of each of the PB statuses are contained in Table 5 below.

TABLE 5

PB Statuses.

| Status | Description |
|---|---|
| UNKNOWN | The status of the neighboring network element 14f is not known. |
| ACTIVATING_DOWNSTREAM | The neighboring network element 14f has finished local activation and initiated activation in the downstream direction. |
| ACTIVATION_COMPLETE | The activation is complete for each of the network element(s) 14a-n downstream. |
| DEACTIVATING_DOWNSTREAM | The neighboring network element 14f has forwarded the deactivation request to network element(s) 14a-n downstream. |
| DEACTIVATION_COMPLETE | The deactivation is complete from network element(s) 14a-n downstream to the local network element 14e. |
| FAILED | Indicates the activation or deactivation request has failed on network element(s) 14a-n downstream. |

Referring now to FIG. 7, shown therein is a sequence diagram of an exemplary embodiment of a HELLO PDU exchange 258 between a local network element 14e and a neighboring network element 14f constructed in accordance with the present disclosure. The HELLO PDU exchange 258 may be initiated in order to establish a two-way adjacency relationship between the local network element 14e and the neighboring network element 14f. The HELLO PDU exchange 258 may be repeated periodically in order to maintain the adjacency relationship between the local network element 14e and the neighboring network element 14f and/or in order to refresh the PB states.

Upon the instantiation of a PB on an optical interface 206, 210, or 218, the HELLO PDU exchange 258 is initiated. Types of HELLO PDUs which may be involved in the HELLO PDU exchange 258 are a HELLO request 262 indicative of a request to determine a status of the adjacency relationship between the local network element 14e and the neighboring network element 14f and a HELLO response 266 indicative of a confirmation of the status of the adjacency relationship between the local network element 14e and the neighboring network element 14f. Every HELLO request 262 sent by, for example, the local network element 14e may be replied to with a HELLO response 266 by, for example, the neighboring network element 14f. A definition of an exemplary HELLO request 262 is contained in Table 6 below.

TABLE 6

HELLO REQUEST TLV Definition.

| Sub-TLV Type (2B) | Sub-TLV Length (2B) | Sub-TLV Value | Mandatory? | Description |
|---|---|---|---|---|
| SRC_INSTANCE (33) | 4 | 32-bit value | M | Non-zero value. This must be reset |

TABLE 6-continued

HELLO REQUEST TLV Definition.

| Sub-TLV Type (2B) | Sub-TLV Length (2B) | Sub-TLV Value | Mandatory? | Description |
|---|---|---|---|---|
| | | | | on restart or when communication with the neighboring network element 14f is lost. |
| DST_INSTANCE (34) | 4 | 32-bit value | M | Most recent SRC_INSTANCE received from the neighboring network element 14f. Initialized with zero. |
| CAPABILITY (35) | 4 | Bitmap of Capabilities | M | All the bits must be set to zero. |
| HELLO_STATE (36) | 4 | enum { INIT, RESP_MISSED, ACTIVE, } | M | Current State of the HELLO PDU exchange 258 on the neighboring network element 14f. INIT: HELLO PDU exchange 258 has been Restarted. RESP_MISSED: No HELLO response 266 received for the last HELLO request 262. ACTIVE: Actively exchanging HELLO PDUs. |
| HELLO_SEQ_NUM (60) | 4 | 32-bit value | M | An increasing number. |

A definition of an exemplary HELLO response 266 is contained in Table 7 below.

TABLE 7

HELLO RESPONSE TLV Definition.

| Type (2B) | Length (2B) | Value | Mandatory? | Description |
|---|---|---|---|---|
| SRC_INSTANCE (33) | 4 | 32-bit value | M | Non-zero value. This must be reset on restart or when communication with a neighboring network element 14f is lost. |
| DST_INSTANCE (34) | 4 | 32-bit value | M | Most recent SRC_INSTANCE received from the neighboring network element 14f. |
| CAPABILITY (35) | 4 | Bitmap of Capabilities | M | For future use. All the bits must be set to zero. |
| HELLO_SEQ_NUM (60) | 4 | 32-bit value | M | HELLO_SEQ_NUM received in the HELLO request 262 for which this HELLO response 266 is being generated. |

The HELLO request 262 and the HELLO response 266 may be correlated to each other using a HELLO sequence number (or HELLO_SEQ_NUM). Each HELLO request 262 may include a monotonically increasing HELLO sequence number. That is, a first HELLO request 262 may have a HELLO sequence number of 1, a second HELLO request 262 may have a HELLO sequence number of 2, etc. Each HELLO response 266 may include the HELLO sequence number of the HELLO request 262 to which it is responding. That is, a HELLO request 262 with the HELLO sequence number of 1 may be replied to with a HELLO response 266 with a HELLO sequence number of 1. If a HELLO request 262 is replied to with a HELLO response 266 and the HELLO sequence numbers do not match, then the HELLO response 266 may be discarded by, for example, the local network element 14e.

A HELLO interval (or a "HELLO period") 268 may refer to an interval (i.e., a predetermined time period) in which HELLO requests 262 and HELLO responses 266 are generated. In some embodiments, the HELLO interval 268 may be 30 seconds in length. However, in other embodiments, the HELLO interval 268 may be more or less than 30 seconds in length. A DEAD interval may refer to an interval (i.e., a predetermined time period) in which one or more consecutive HELLO cycles elapse without receiving a HELLO response 266. After the DEAD interval elapses, the adjacency relationship with the neighboring network element 14f is taken down. In some embodiments, the DEAD interval may be 150 seconds in length. A Protocol Administrative State may refer to a state of an optical interface 206, 210, or 218 which may be either of "Locked" or "Unlocked". The OCP 182 may not send or receive PDUs on an optical interface 206, 210, or 218 that is in the "Locked" state. An Associated Control Channel Status may refer to an operational status of an associated control channel (e.g., an Optical Supervisory Channel) which may be either of "UP" or "DOWN".

When a first PB instance is instantiated on an express optical interface 210, the HELLO PDU exchange 258 may be initiated on such express optical interface 210. However, for line interfaces 218, the HELLO PDU exchange 258 may be initiated as the neighboring network element 14f is associated with the local network element 14e, regardless of the presence or absence of PB instances. A HELLO request 262 may not be originated if the HELLO PDU exchange 258 has not been initiated. The HELLO PDU exchange 258 may involve a number of different HELLO states: an "INIT" state in which the HELLO PDU exchange 258 has just been initialized; a "RESP_MISSED" state in which a corresponding HELLO response 266 was not received for the most recently sent HELLO request 262; and an "ACTIVE" state in which a corresponding HELLO response 266 was received for the most recently sent HELLO request 262.

For the local network element 14e, a two-way association is established upon the reception of a HELLO response 266 with a DST_INSTANCE (discussed further below) which matches the SRC_INSTANCE (discussed further below) of the local network element 14e. Similarly, for the neighboring network element 14f, a two-way association is established upon satisfaction of two conditions: the local network element 14e having an "ACTIVE" HELLO state and reception of a HELLO request 262 with a DST_INSTANCE (discussed further below) which matches the SRC_INSTANCE (discussed further below) of the neighboring network element 14f.

In some embodiments, each of the local network element 14e and the neighboring network element 14f is either a requestor or a responder. However, in other embodiments, each of the local network element 14e and the neighboring network element 14f is both of a requestor and a responder. Where a network element 14 (e.g., the local network element 14e or the neighboring network element 14f) transmits a HELLO response 266 (i.e., is the responder) in a particular HELLO interval 268, said network element 14 may not be required to originate a HELLO request 262 (i.e., be the requestor) in a subsequent HELLO interval 268. Where both of two network elements 14a-n transmit a HELLO response 266 (i.e., are responders) in the particular HELLO interval 268, the responder and the requestor in the subsequent HELLO interval 268 may be determined based at least in part on a node or network element identifier. In some embodiments, the network element 14 (e.g., the local network element 14e or the neighboring network element 14f) having a node or network element identifier with a higher value is determined to be the requestor in the subsequent HELLO interval 268, and the network element 14 having a node or network element identifier with a lower value is determined to be the responder in the subsequent HELLO interval 268.

If a HELLO response 266 is not received for one or more consecutive HELLO request 262 during a DEAD interval, the neighbor association may be degraded from TWO-WAY to ONE-WAY.

The HELLO PDUs (i.e., the HELLO requests 262 and the HELLO responses 266) may contain two parameters: an SRC_INSTANCE and a DST_INSTANCE. These parameters may be used to determine a reason for a most recent change in a neighbor association. Responsive to a neighbor association being degraded from TWO-WAY to ONE-WAY, the SRC_INSTANCE of a subsequent HELLO PDU (i.e., the HELLO request 262 or the HELLO response 266) may be incremented as an indicator that the neighbor association has been degraded from TWO-WAY to ONE-WAY.

The SRC_INSTANCE parameter may be 32 bits in length and may be generated upon initialization of the HELLO PDU exchange 258 on an optical interface 206, 210, or 218. In some embodiments, a current timestamp of the OCP 182 may be encoded in the SRC_INSTANCE parameter. In some embodiments, the value of the SRC_INSTANCE parameter may not be zero at any time. The value of the SRC_INSTANCE parameter may be regenerated (or incremented) whenever a neighbor adjacency transitions from TWO-WAY to a ONE-WAY. When this occurs, a network element 14 may store the current SRC_INSTANCE parameter and the previous SRC_INSTANCE parameter.

The DST_INSTANCE parameter may reflect the SRC_INSTANCE parameter of the neighboring network element 14f received in the last received HELLO request 262 or HELLO response 266. In some embodiments, the DST_INSTANCE parameter may be set to zero in a first HELLO PDU exchange 258 after startup. In such embodiments, the DST_INSTANCE parameter may not be zero at any time thereafter.

Determining a reason underlying a neighboring network element 14f changing its association with a local network element 14e (e.g., from a TWO-WAY association to a ONE-WAY association) may be based at least in part on a value of a DST_INSTANCE parameter of a HELLO PDU received by the local network element 14e from the neighboring network element 14f. Interpretations of the various values of the DST_INSTANCE parameter are contained in Table 8 below.

TABLE 8

Interpretations of various values of the DST INSTANCE parameter

| Value of DST_INSTANCE | Interpretation |
| --- | --- |
| Zero | The neighboring network element 14f has not remembered the previous SRC_INSTANCE parameter received from the |

TABLE 8-continued

Interpretations of various values of the DST_INSTANCE parameter

| Value of DST_INSTANCE | Interpretation |
|---|---|
| | local network element 14e. The neighboring network element 14f has likely restarted due to a warm or cold reboot. |
| Matches the local network element's 14e previous SRC_INSTANCE | The neighboring network element 14f has recovered from an intermittent communication loss. |
| Matches with the local network element's 14a current SRC_—INSTANCE | The association with the neighboring network element 14f is fully active. |
| Does not match with the local network element's 14e previous or current SRC_INSTANCE | This should not happen. It may be treated as if the neighboring network element 14f has restarted. |

It should be noted that with any association with a neighboring network element 14f remaining UP, if a HELLO PDU is received from the neighboring network element 14f with a value of the SRC_INSTANCE parameter different from the previous SRC_INSTANCE parameter, the local network element 14e should treat it as a NBR ONE-WAY event 254j and transition to a ONE-WAY state 250c.

When a last remaining PB instance is deleted on an express optical interface 210, the OCP 182 may start a LAST_PB_DEL_SOAK_TIMER timer with a predetermined duration. The system being operable to disable the HELLO PDU exchange 258 responsive to the LAST_PB_DEL_SOAK_TIMER timer elapsing. When the HELLO PDU exchange 258 is disabled, no HELLO requests 262 may be generated and any received HELLO requests may be discarded. If a new PB instance is created while the LAST_PB_DEL_SOAK_TIMER timer is running, the OCP 182 may stop the LAST_PB_DEL_SOAK_TIMER timer and cancel the operation. However, on line interfaces 218, the HELLO PDU exchange 258 may remain enabled irrespective of the creation, deletion, or presence of any PB instances.

Figure 8A:
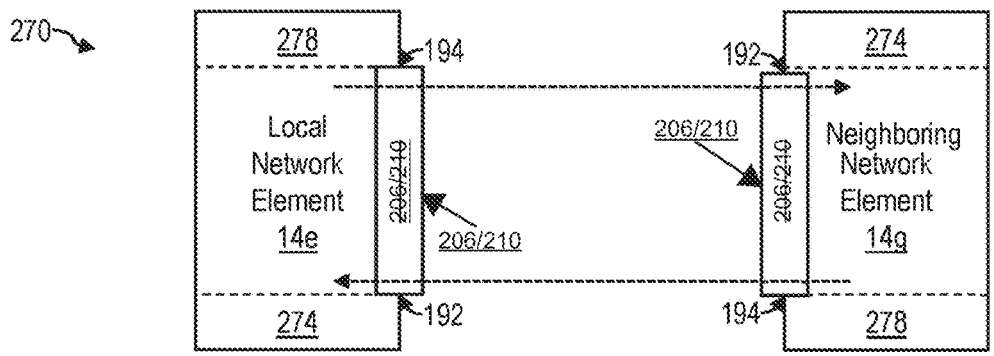
FIG. 8A is a block diagram of an exemplary embodiment of an adjacency relationship between a local network element and a neighboring network element constructed in accordance with the present disclosure.

Referring now to FIG. 8A, shown therein is a block diagram of an adjacency relationship 270 (also referred to herein as an "optical link 270") between a local network element 14e and a neighboring network element 14f. For each network element 14 in each adjacency relationship 270 in the transport network 10, the ingress pipeline 192 is treated as the SLAVE side 274 and the egress pipeline 194 is treated as the MASTER side 278.

Synchronization of PB states between the network elements 14 in the adjacency relationship 270 may begin as soon as a MASTER side 278 of either of the network elements 14 is transitioned into the TWO-WAY state 250d, which may cause the MASTER side 278 of the local network element 14e to begin synchronizing the PB states of the egress pipeline 194 with the SLAVE side 274 (i.e., the ingress pipeline 192) of the neighboring network element 14f. A REFRESH PDU exchange 282 (shown in FIG. 8B) may be used to accomplish such synchronization. The neighbor FSM 246 of the local network element 14e may not transition into the UP state 250a unless a REFRESH acknowledgment 290 (shown in FIG. 8B) is received from the neighboring network element 14f.

Figure 8B:
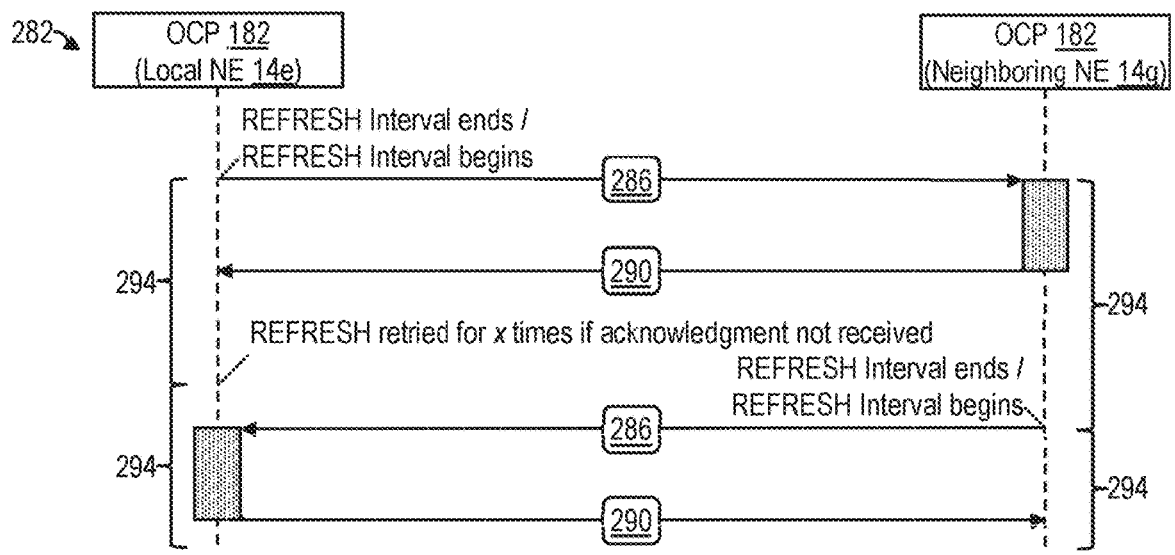
FIG. 8B is a sequence diagram of an exemplary embodiment of a REFRESH PDU exchange for ensuring that PB states are synchronized between a local network element and a neighboring network element constructed in accordance with the present disclosure.

Referring now to FIG. 8B, shown therein is a sequence diagram of an exemplary embodiment of a REFRESH PDU exchange 282 constructed in accordance with the present disclosure. The REFRESH PDU exchange 282 may ensure that PB states are synchronized between a local network element 14e and a neighboring network element 14f. There are two types of PDUs involved in the REFRESH PDU exchange 282: a REFRESH message 286 indicative of a state of each of the PBs at the transmitting network element 14 (i.e., the one of the local network element 14e and the neighboring network element 14f which sent the REFRESH message 286) and a REFRESH acknowledgment 290 indicative of a state of each of the PBs at the receiving network element 14 (i.e., the one of the local network element 14e and the neighboring network element 14f which received the REFRESH message 286).

The REFRESH messages 286 and the REFRESH acknowledgments 290 may include the PB states of the local network element 14e from the MASTER side 278 of the local network element 14e to the SLAVE side 274 of the neighboring network element 14f. The PB states may be one of an ACTIVATED state, a DEACTIVATED state, and an AWAITING DOWNSTREAM DEACTIVATION state. Each of the REFRESH messages 286 and the REFRESH acknowledgments 290 may further include a RESYNC sequence number for correlating REFRESH messages 286 with their corresponding REFRESH acknowledgments 290, which may similar in form and function to the HELLO sequence number.

A definition of an exemplary REFRESH message 286 is contained in Table 9 below.

TABLE 9

REFRESH TLV Definition.

| Type (2B) | Length (2B) | Value | Mandatory? | Description |
|---|---|---|---|---|
| DST_DIRECTION (37) | 2 | enum { INGRESS=0, EGRESS } | M | Should be set to INGRESS. |

TABLE 9-continued

REFRESH TLV Definition.

| Type (2B) | Length (2B) | Value | Mandatory? | Description |
|---|---|---|---|---|
| REFRESH_SEQ_NUM (52) | 4 | Unsigned Integer | M | An incrementing number. |
| ACT_PB_LIST (53) | Variable | List of PB-IDs | O | List of Activated PB-IDs. Each PB-ID is coded as 8 Byte Number. |
| DEACT_PB_LIST (54) | Variable | List of PB-IDs | O | List of Deactivated PB-IDs. Each PB-ID is coded as 8 Byte Number. |
| DEACT_WAIT_PB_LIST (55) | Variable | List of PB-IDs | O | List of PB-IDs awaiting downstream deactivation. Each PB-ID is coded as 8 Byte Number. |
| FAULTED_PB_LIST (58) | Variable | List of PB-IDs | O | List of Faulted PB-IDs. Each PB-ID is coded as 8 Byte Number. |
| SYNC_WAIT_PB_LIST (59) | Variable | List of PB-IDs | O | List of PBs for which upstream sync is pending. |

A definition of an exemplary REFRESH acknowledgment 290 is contained in Table 10 below.

TABLE 10

REFRESH ACK TLV Definition.

| Type (2B) | Length (2B) | Value | Mandatory | Description |
|---|---|---|---|---|
| DST_DIRECTION (37) | 2 | enum { INGRESS=0, EGRESS } | M | Should be set to EGRESS. |
| REFRESH_SEQ_NUM (52) | 4 | Unsigned Integer | M | REFRESH_SEQ_NUM received in the REFRESH message 286 for which this REFRESH acknowledgment 290 is being generated. |
| ACK_PB_LIST (40) | Variable | List of PB-IDs | M | List of ACKed PB-IDs. Each PB-ID is coded as 8 Byte Number. |
| NACK_PB_LIST (41) | Variable | List of PB-IDs | M | List of NACKed PB-IDs. For Each PB-ID is coded as 8 Byte Number. |
| ACTIVATION_STATUS_TLV (5) | Variable | (See TLV Definition) | M | |
| DEACTIVATION_STATUS_TLV (8) | Variable | (See TLV Definition) | M | |

The MASTER side 278 of an adjacency relationship 270 may generate REFRESH messages 286 during a recurring REFRESH interval 294 and during a reestablishment of an adjacency relationship 270 (i.e., the SYNC state 250e). If the MASTER side 278 does not receive a REFRESH acknowledgment 290 during the REFRESH interval 294, the MASTER side 278 may re-attempt the REFRESH PDU exchange 282. After attempting the REFRESH PDU exchange 282 a predetermined number of consecutive times, the OCP 182 may abort the REFRESH PDU exchange 282 until the start of a subsequent REFRESH interval 294, at which time the OCP 182 may re-attempt the REFRESH PDU exchange 282 again. If the MASTER side 278 does not receive a REFRESH acknowledgment 290 during the reestablishment of an adjacency relationship 270, the OCP 182 may not abort the current REFRESH PDU exchange 282; instead, the OCP 182 may continue re-attempting the REFRESH PDU exchange 282 until either a REFRESH acknowledgment 290 is received or the neighbor FSM 246 is transitioned into the DOWN state 250b.

It should be noted that the loss of a REFRESH message 286 or REFRESH acknowledgment 290 may not affect the PB states; the REFRESH PDU exchange 282 may merely serve as an additional safeguard to ensure consistency between the MASTER side 278 and the SLAVE side 274 of an optical link 270.

The SLAVE side 274 of an optical link 270 may receive and process the REFRESH messages 286. For each of the PBs whose PB states are included in the REFRESH message 286, the SLAVE side 274 may activate or deactivate the PBs in response to the PB state. Each of the PBs whose PB state is ACTIVATED in the REFRESH message 286 may be activated on the SLAVE side 274. Each of the PBs whose PB state is DEACTIVATED or AWAITING_DOWNSTREAM_DEACTIVATION in the REFRESH message 286 may be deactivated on the SLAVE side 274.

As an acknowledgment of its receipt of the REFRESH message 286, the SLAVE side 274 may generate a REFRESH acknowledgment 290 having the same REFRESH sequence number as the received REFRESH message 286. The REFRESH acknowledgment 290 may further include an PB acknowledgment list (or ACK_PB_LIST) containing the PBs whose PB state exists on the SLAVE side 274 and correctly corresponds to their PB state on the MASTER side 278. The REFRESH acknowledgment 290 may further include a PB negative acknowledgment list (or NACK_PB_LIST) containing the PBs whose PB state does not exist on the SLAVE side 274 or does not correctly correspond to their PB state on the MASTER side 278. If one or more of the PB states in the REFRESH message 286 are AWAITING_UPSTREAM_SYNC, the SLAVE side 274 may include the corresponding local PB states if they exist locally in the PB acknowledgment list and if they do not exist locally in the PB negative acknowledgment list. Further, the OCP 182 may report such PBs to the local orchestrator 248.

Figure 9A:
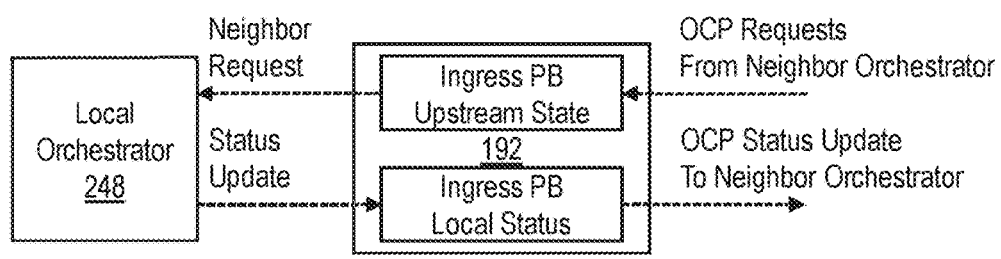
FIG. 9A is a block diagram of an exemplary embodiment of an ingress pipeline constructed in accordance with the present disclosure.

Referring now to FIG. 9A, shown therein is a block diagram of an exemplary embodiment of an ingress pipeline 192 constructed in accordance with the present disclosure. The ingress pipeline 192 of a local network element 14e may be operable to manage PB state updates and action requests for the PBs in an ingress direction (i.e., a receive direction of an optical interface 206, 210, or 218). One or more operation performed by the ingress pipeline 192 may be initiated by an orchestrator 248 of a neighboring network element 14f (e.g., an upstream neighboring network element 14f). The ingress pipeline 192 may be operable to perform such operation based at least in part on receiving an OCP message (i.e., a PDU) from the orchestrator 248 of the neighboring network element 14f. The ingress pipeline 192 may be operable to control an orchestrator state of an orchestrator 248 of the local network element 14e based at least in part on the OCP message.

Figure 9B:
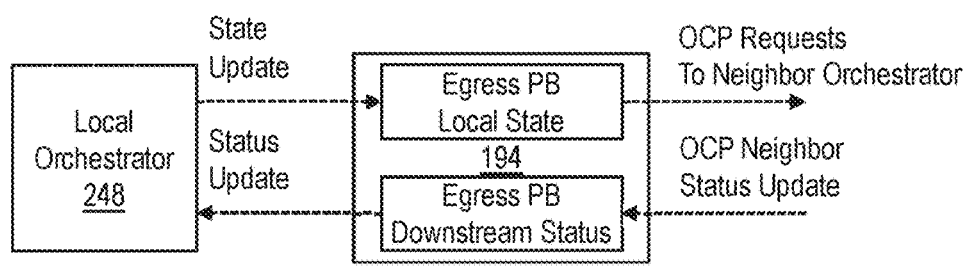
FIG. 9B is a block diagram of an exemplary embodiment of an egress pipeline constructed in accordance with the present disclosure.

Referring now to FIG. 9B, shown therein is a block diagram of an exemplary embodiment of an egress pipeline 194 constructed in accordance with the present disclosure. The egress pipeline 194 of a local network element 14e may be operable to manage PB state updates and action requests for the PBs in an egress direction (i.e., a transmit direction of an optical interface 206, 210, or 218). One or more operation performed by the egress pipeline 194 may be initiated by an orchestrator 248 of the local network element 14e. The egress pipeline 194 may be operable to perform such operation based at least in part on the orchestrator 248 of the local network element 14e. The egress pipeline 194 may be operable to control an orchestrator state of an orchestrator 248 of the neighboring network element 14f sending an OCP message (i.e., a PDU) to the orchestrator 248 of the neighboring network element 14f.

Figure 10A:
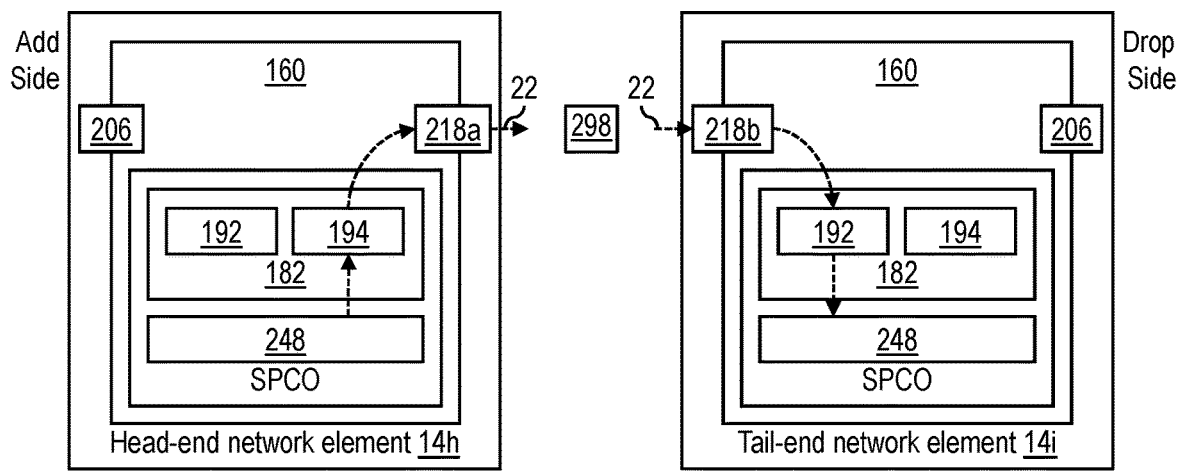
FIG. 10A is a block diagram of another exemplary embodiment of a transport network constructed in accordance with the present disclosure.

Referring now to FIG. 10A, shown therein is a block diagram of an exemplary embodiment of a transport network 10 constructed in accordance with the present disclosure. FIG. 10A depicts a transport network 10 comprising a degree-level deployment of the OCP 182. As shown in FIG. 10A, the transport network 10 may comprise a head-end network element 14g (i.e., a network element 14 at which one or more PB is to be added) and a tail-end network element 14h (i.e., a network element 14 at which one or more PB is to be dropped). The head-end network element 14g and the tail-end network element 14h (and the intermediary network element 14i discussed further below) may be any of the network elements 14a-n of the transport network 10 and may be determined by a user. In some embodiments, each of the head-end network element 14g and the tail-end network element 14h is an FRM 160 being operated on by the OCP 182 as a discrete virtual network element 14.

Figure 10B:
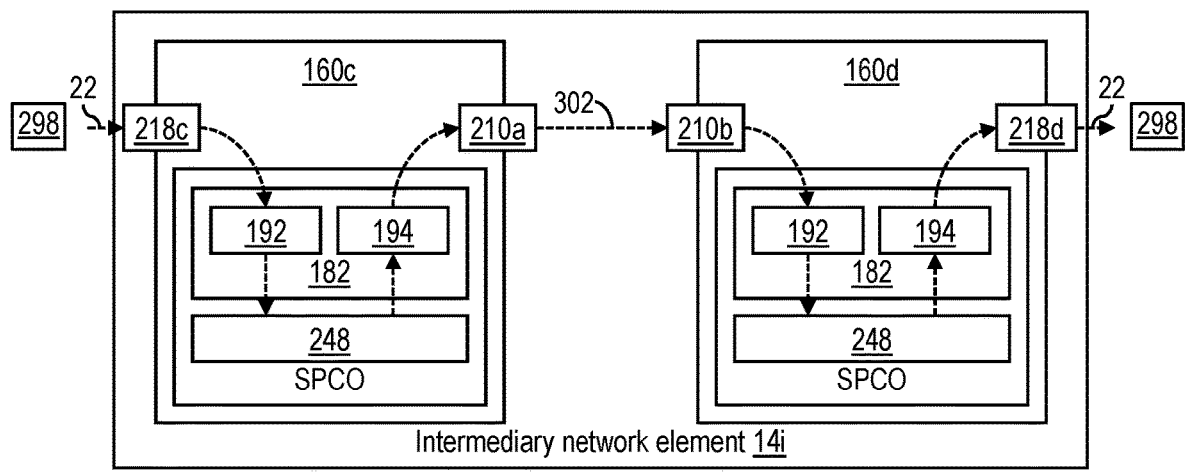
FIG. 10B is a block diagram of an exemplary embodiment of an intermediary network element of the transport network shown in FIG. 10A, constructed in accordance with the present disclosure.

Each of the head-end network element 14g and the tail-end network element 14h may comprise an FRM 160. The head-end network element 14g may comprise a first line optical interface 218a, and the tail-end network element 14h may comprise a second line optical interface 218b. The head-end network element 14g and the tail-end network element 14h may be connected to each other by one or more fiber optic line 22 and one or more network element 14 (e.g., an express network element 14 such as the intermediary network element 14i as shown in FIG. 10B) forming an optical path 18.

To begin an activation process, an orchestrator 248 of the head-end network element 14g may activate one or more passband on the first line interface 218a, thereby enabling the first line interface 218a to transport one or more optical carrier on the one or more passband on the fiber optic line 22. Activating a passband on an optical interface 206, 210, or 218 of a network element 14 may comprise creating a cross-connection between two WSS modules 70a-n of the network element 14 and enabling one or more optical power control loop operable to adjust a configuration of the two WSS modules 70a-n. The cross-connection may be created based at least in part on a provisioned cross-connection, the provisioned cross-connection being provisioned by a user.

Subsequently, the orchestrator 248 may promote the PB state of the egress PBs on the first line interface 218a to ACTIVATED. The egress pipeline 194 may, responsive to determining that the PB state of the egress PBs on the line interface 218 has changed, generate an activation request 310 identifying one or more PB and being indicative of a request to activate the one or more PB on a plurality of optical interfaces 206, 210, or 218 on a plurality of network elements 14 connected in series, thereby enabling the plurality of optical interfaces 206, 210, or 218 to transport the one or more optical carrier on the one or more PB on a fiber optic line 22 and transmit the activation request 310 downstream on the fiber optic line 22.

Responsive to receiving the activation request 310 at the second line interface 218b, an ingress pipeline 192 of the tail-end network element 14h may process the activation request 310 (i.e., by transmitting upstream an activation acknowledgment being indicative of a current capacity of the second line interface 218b to communicate via each of the one or more PB on the fiber optic line 22) and forward the activation request 310 to an orchestrator 248 of the tail-end network element 14h. The orchestrator 248 of the tail-end network element 14h may activate one or more passband on the second line interface 218b, thereby enabling the second line interface 218b to transport the one or more optical carrier on the one or more passband on the fiber optic line 22. Subsequently, the orchestrator 248 may promote the PB state of the ingress PBs on the second line interface 218b to ACTIVATION COMPLETED. The ingress pipeline 192 of the tail-end network element 14h may, responsive to determining that the PB state of the ingress PBs on the second line interface 218b has changed, transmit a completed activation status message 318 upstream on the fiber optic line 22.

The ingress pipeline 192 of the head-end network element 14g may receive the completed activation status message 318 from downstream on the fiber optic line 22. Responsive to receiving the completed activation status message 318, the egress pipeline 194 of the head-end network element 14g may transmit an activation status acknowledgment 322 indicative of a current capacity of the first line interface 218a to transport the one or more optical carrier of each of the one or more PB on the fiber optic line 22.

To begin a deactivation process, an orchestrator 248 may promote the PB state of the egress PBs on the first line interface 218a to AWAITING_DOWNSTREAM_DEACTIVATION. The egress pipeline 194 may, responsive to determining that the PB state of the egress PBs on the line interface 218 has changed, generate a deactivation request 330 identifying one or more PB and being indicative of a request to deactivate the one or more PB on a plurality of optical interfaces 206, 210, or 218 on a plurality of network elements 14 connected in series, thereby disabling the plurality of optical interfaces 206, 210, or 218 from transporting the one or more optical carrier on the one or more PB on the fiber optic line 22 and transmit the deactivation request 320 downstream on the fiber optic line 22.

Responsive to receiving the deactivation request 330 at the second line interface 218b, an ingress pipeline 192 of the tail-end network element 14h may process the deactivation request 330 (i.e., by transmitting upstream a deactivation acknowledgment being indicative of a current capacity of the second line interface 218b to communicate via each of the one or more PB on the fiber optic line 22) and forward the deactivation request 330 to an orchestrator 248 of the tail-end network element 14h. The orchestrator 248 of the tail-end network element 14h may deactivate one or more passband on the second line interface 218b, thereby disabling the second line interface 218b from transporting the one or more optical carrier on the one or more PB on the fiber optic line 22. Deactivating a PB on an optical interface 206, 210, or 218 of a network element 14 may comprise deleting the cross-connection between two WSS modules 70a-n of the network element 14 and enabling one or more optical power control loop operable to adjust a configuration of the two WSS modules 70a-n.

Subsequently, the orchestrator 248 may promote the PB state of the ingress PBs on the second line interface 218b to DEACTIVATION COMPLETED. The ingress pipeline 192 of the tail-end network element 14h may, responsive to determining that the PB state of the ingress PBs on the second line interface 218b has changed, transmit a completed deactivation status message 338 upstream on the fiber optic line 22.

The ingress pipeline 192 of the head-end network element 14g may receive the completed deactivation status message 338 from downstream on the fiber optic line 22. Responsive to receiving the deactivation status message 338, the orchestrator 248 of the head-end network element 14g may deactivate one or more passband on the first line interface 218a. Further, the egress pipeline 194 of the head-end network element 14g may transmit a deactivation status acknowledgment 342 indicative of a current capacity of the first line interface 218a to transport the one or more optical carrier of each of the one or more PB on the fiber optic line 22 and deactivate the one or more PB on the first line interface 218a, thereby disabling the first line interface 218a from transporting the one or more optical carrier on the one or more PB on the fiber optic line 22.

Referring now to FIG. 10B, shown therein is a block diagram of an exemplary embodiment of a transport network 10 constructed in accordance with the present disclosure. FIG. 10B depicts a transport network 10 comprising a degree-level deployment of the OCP 182. As shown in FIG. 10B, the transport network 10 may further comprise an intermediary network element 14i. The express network element 14i may comprise a first FRM 160c, a second FRM 160d, a third line interface 218c, and a fourth line interface 218d. The express network element 14i may be connected to the head-end network element 14g and the tail-end network element 14h via a plurality of fiber optic lines 22 and one or more network element 14 (e.g., a second express network element 14i). The first FRM 160c and the second FRM 160d may be connected to each other by an express link 302.

The third line interface 218c may receive an activation request 310 from an upstream network element 14 (e.g., the head-end network element 14g) on a fiber optic line 22. Responsive to receiving the activation request 310, the ingress pipeline 192 of the first FRM 160c may process the activation request 310 (i.e., by transmitting an activation acknowledgment upstream) and forward the activation request 310 to the orchestrator 248 of the first FRM 160c. The orchestrator 248 of the first FRM 160c may activate the one or more passband on the third line interface 218c, thereby enabling the third line interface 218c to transport the one or more optical carrier on the one or more passband on the fiber optic line 22.

Subsequently, the orchestrator 248 may promote the PB state of the ingress PBs on the third line optical interface 218c and the egress PBs on a first express optical interface 210a to ACTIVATION IN PROGRESS and ACTIVATED, respectively. The ingress pipeline 192 of the first FRM 160c may, responsive to determining that the PB state of the ingress PBs on the third line interface 218c has changed, transmit an in-progress activation status upstream on the fiber optic line 22. The egress pipeline 194 of the first FRM 160c may, responsive to determining that the PB state of the egress PBs on the first express interface 210a has changed, transmit the activation request 310 downstream on the express link 302.

A second express interface 210b of the second FRM 160d may receive the activation request 310 from the first FRM 160c. Responsive to receiving the activation request 310, an ingress pipeline 192 of the second FRM 160d may process the activation request 310 (i.e., by transmitting an activation acknowledgment upstream) and forward the activation request 310 to an orchestrator 248 of the second FRM 160d. The orchestrator 248 of the second FRM 160d may activate the one or more passband on the fourth line interface 218d, thereby enabling the fourth line interface 218d to transport the one or more optical carrier on the one or more passband on the fiber optic line 22. Subsequently, the orchestrator 248 may promote the PB state of ingress PBs on the second express interface 210b and egress PBs on the fourth line interface 218d to ACTIVATION IN PROGRESS and ACTIVATED, respectively. The ingress pipeline 192 may, responsive to determining that the PB state of the ingress PBs on the second express interface 210b has changed, transmit an in-progress activation status upstream on the express link 302. The egress pipeline 194 may, responsive to determining that the PB state of the egress PBs on the fourth line interface 218d has changed, transmit the activation request 310 to a downstream network element 14 (e.g., the tail-end network element 14h) on a fiber optic line 22.

As part of an activation process, the intermediary network element 14i may receive, via the third line interface 218c of the first FRM 160c, the activation request 310 from upstream on the fiber optic line 22. Responsive to receiving the activation request 310, an ingress pipeline 192 of the first FRM 160c may process the activation request 310 (i.e., by transmitting upstream an activation acknowledgment 314) and forward the activation request 310 to an orchestrator 248 of the first FRM 160c. The orchestrator 248 of the first FRM 160c may activate the one or more PB on the third line interface 218c and/or the first express interface 210a. The orchestrator 248 may promote the PB state of the ingress PBs on the third line interface 218c and the egress PBs on the first express interface 210a to IN-PROGRESS and ACTIVATED, respectively. The ingress pipeline 192 may, responsive to determining that the PB state of the ingress PBs on the third line interface 218c has changed, generate an in-progress activation status message 338 and transmit the in-progress deactivation status message 338 upstream on the fiber optic line 22. The egress pipeline 194 may, responsive to determining that the PB state of the egress PBs on the first express interface 210a has changed, generate an activation request 310 and transmit the activation request 310 on the express link 302.

Subsequently, the intermediary network element 14i may receive, via the second express interface 210b of the second FRM 160d, the activation request 310 on the express link 302. Responsive to receiving the activation request 310, an ingress pipeline 192 of the second FRM 160d may process the activation request 310 (i.e., by transmitting on the express link 302 an activation acknowledgment) and forward the activation request 310 to an orchestrator 248 of the second FRM 160d. The orchestrator 248 of the second FRM 160d may activate the one or more PB on the second express interface 210b and/or the fourth line interface 218d. Subsequently, the orchestrator 248 may promote the PB state of the ingress PBs on the second express interface 210b and the egress PBs on the fourth line interface 218d to IN-PROGRESS and ACTIVATED, respectively. The ingress pipeline 192 of the second FRM 160d may, responsive to determining that the PB state of the ingress PBs on the second express interface 210b has changed, transmit an in-progress activation status message 318 on the express link 302. Further, the egress pipeline 194 may, responsive to determining that the PB state of the egress PBs on the fourth line interface 218d has changed, generate an activation request 310 and transmit the activation request 310 downstream on the fiber optic line 22.

Responsive to receiving the completed activation status message 318 via the fourth line interface 218d, the egress pipeline 194 of the second FRM 160d may transmit an activation status acknowledgment 322 downstream on the fiber optic line 22. Further, the ingress pipeline 192 of the second FRM 160d may transmit the completed activation status message 318 on the express link 302. The first FRM 160c may receive the completed activation status message 318 via the first express interface 210a on the express link 302. Responsive to receiving the completed activation status message 318, the egress pipeline 194 of the first FRM 160c may transmit an activation status acknowledgment 322 on the express link 302. Further, the ingress pipeline 192 of the first FRM 160c may transmit the completed activation status message 318 upstream on the fiber optic line 22.

As part of a deactivation process, responsive to receiving the deactivation request 330 at the third line interface 218c, the ingress pipeline 192 of the first FRM 160c may process the deactivation request 330 (i.e., by transmitting a deactivation acknowledgment 334 upstream on the fiber optic line 22) and forward the deactivation request 330 to an orchestrator 248 of the first FRM 160c. The orchestrator 248 may promote the PB state of the ingress PBs on the third line interface 218c and/or the egress PBs on the first express interface 210a to AWAITING DOWNSTREAM DEACTIVATION. The ingress pipeline 192 may, responsive to determining that the PB state of the ingress PBs on the third line interface 218c has changed, generate an in-progress deactivation status message 338 and transmit the in-progress deactivation status message 338 upstream on the fiber optic line 22. The egress pipeline 194 may, responsive to determining that the PB state of the egress PBs on the third line interface 218c has changed, generate a deactivation request 330 and transmit the deactivation request 320 on the express link 302.

Responsive to receiving the deactivation request 330 at the fourth line interface 218b, the ingress pipeline 192 of the second FRM 160d may process the deactivation request 330 (i.e., by transmitting a deactivation acknowledgment 334 on the express link 302) and forward the deactivation request 330 to an orchestrator 248 of the second FRM 160d. The orchestrator 248 may promote the PB state of the ingress PBs on the second express interface 210b and/or the egress PBs on the fourth line interface 218d to AWAITING DOWNSTREAM DEACTIVATION. The ingress pipeline 192 may, responsive to determining that the PB state of the ingress PBs on the second express interface 210b has changed, generate an in-progress deactivation status message 338 and transmit the in-progress deactivation status message 338 on the express link 302. The egress pipeline 194 may, responsive to determining that the PB state of the egress PBs on the fourth line interface 218d has changed, generate a deactivation request 330 and transmit the deactivation request 320 downstream on the fiber optic line 22.

Responsive to receiving the completed deactivation status message 338, the egress pipeline 194 of the second FRM 160d may transmit a deactivation status acknowledgment 342 downstream on the fiber optic line 22 and deactivate the one or more PB on the second express interface 210b and/or the fourth line interface 218d. Subsequently, the orchestrator 248 may promote the PB state of the egress PBs on the fourth line interface 218d and/or the ingress PBs on the second express interface 210b to DEACTIVATION COMPLETED. The ingress pipeline 192 of the second FRM 160d may, responsive to determining that the PB state of the ingress PBs on the third express interface 210b and/or the egress PBs on the fourth line interface 218d has changed, transmit a completed deactivation status message 338 on the express link 302.

Responsive to receiving the deactivation status message 338, the egress pipeline 194 of the first FRM 160c may transmit a deactivation status acknowledgment 342 on the express link 302. Subsequently, the orchestrator 248 may promote the PB state of the ingress PBs on the third line interface 218c and/or the egress PBs on the first express interface 210a to DEACTIVATION COMPLETED. The ingress pipeline 192 of the first FRM 160c may, responsive to determining that the PB state of the ingress PBs on the third line interface 218c and/or the egress PBs on the first express interface 210a has changed, transmit a completed deactivation status message 338 upstream on the fiber optic line 22.

Figure 11:
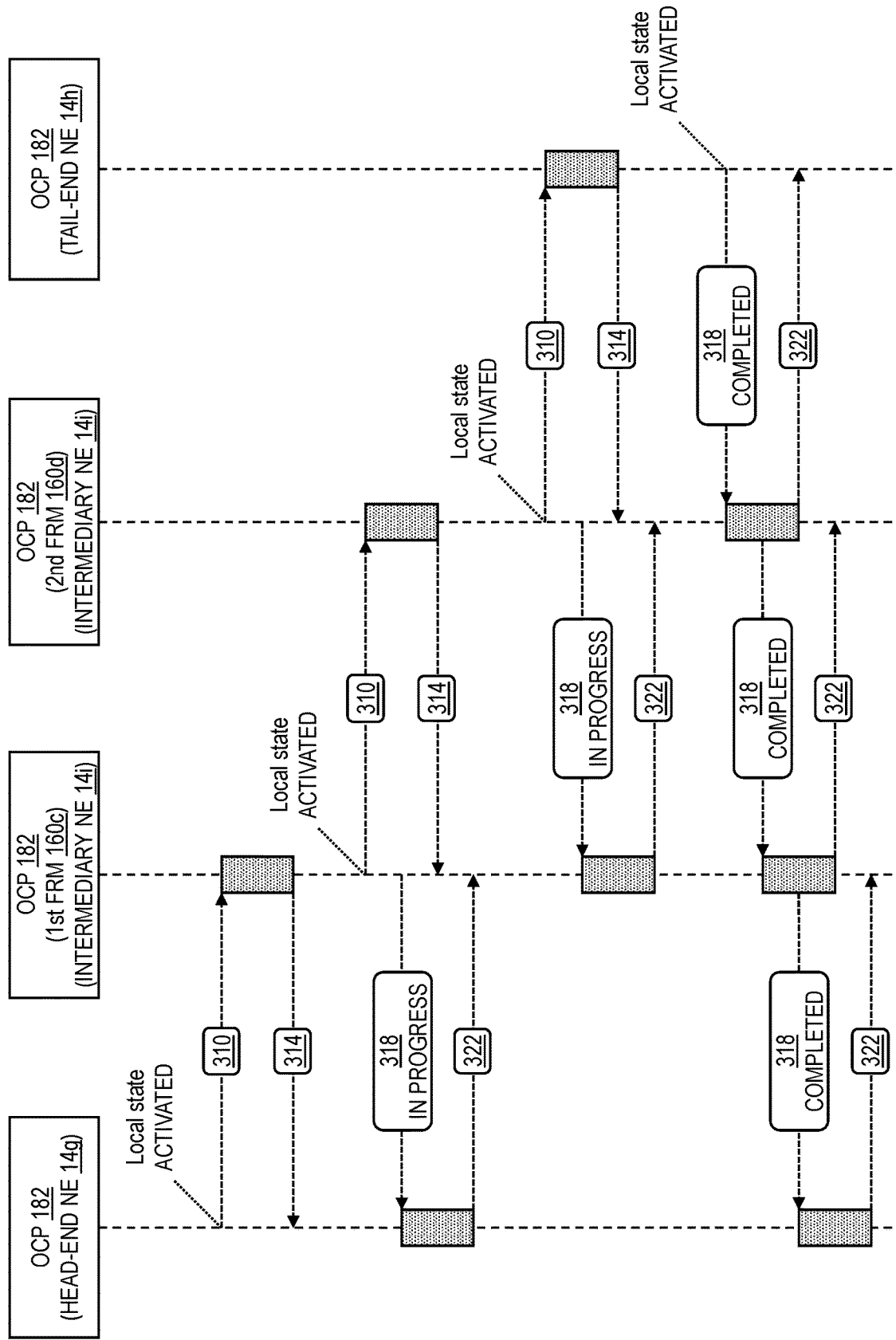
FIG. 11 is a sequence diagram of an exemplary embodiment of an activation sequence for a plurality of network elements connected in a series constructed in accordance with the present disclosure.

Referring now to FIG. 11, shown therein is a sequence diagram of an exemplary embodiment of an activation sequence 306 for activating the one or more PB on a plurality of network elements 14 connected in a series constructed in accordance with the present disclosure. As shown in FIG. 11, a transport network 10 may comprise a head-end network element 14g, a tail-end network element 14h, and an intermediary network element 14i (i.e., an express network element 14) comprising a first FRM 160c and a second FRM 160d, each of the network elements 14 connected to each other by one or more fiber optic line 22. The transport network 10 may further comprise one or more network element 14 in between each of the network elements 14 shown. Activation may be performed in a unidirectional manner (e.g., from the head-end network element 14g to the tail-end network element 14h, from the intermediary network element 14i to the head-end network element 14g via the tail-end network element 14h, or from the tail-end network element 14h to the intermediary network element 14i via the head-end network element 14g). Types of PDUs which may be involved in the activation sequence 306 are an activation request 310, an activation acknowledgment 314 acknowledging receipt of the activation request 310, an activation status message 318, and an activation status acknowledgment 322 acknowledging receipt of the activation status message 318.

The activation request 310 may identify one or more PB and may be indicative of a request to activate the identified PBs on a plurality of optical interfaces 206, 210, or 218 of a plurality of network elements 14 connected in series, thereby enabling the plurality of optical interfaces 206, 210, or 218 to transport the one or more optical carrier on the one or more PB on the fiber optic line 22. In some embodiments, only a MASTER side 278 of an optical link 270 may generate an activation request 310. In some embodiments, in order for the activation request 310 to be generated, certain preconditions must be satisfied. These preconditions may include that the neighbor FSM 246 of the optical interface 206, 210, or 218 is in the UP state 250a and/or that the local state of one or more PB is in the ACTIVATED state on the optical interface 206, 210, or 218.

In some embodiments, a SLAVE side 274 of the optical link 270 (i.e., the ingress pipeline 192) may receive the activation request 310. Responsive to receiving the activation request 310, the ingress pipeline 192 may verify that the PBs identified by the activation request 310 exist on the network element 14 (i.e., the express network element 14i) and that their state complies with the activation request 310 (i.e., is conducive to receiving and accepting the activation request 310). The ingress pipeline 192 may forward the activation request 310 to the orchestrator 248 of the network element 14 (i.e., the express network element 14i).

In some embodiments, the SLAVE side 274 of the optical link 270 (i.e., the ingress pipeline 192) may generate an activation acknowledgment 314 in response to receiving the activation request 310. The activation request 310 and the activation acknowledgment 314 may be correlated to each other using an activation sequence number (or ACT_SEQ_NUM). Each activation request 310 may include a monotonically increasing activation sequence number, similar to the HELLO request 262. Each activation acknowledgment 314 may include the activation sequence number of the activation request 310 which it is acknowledging, similar to the HELLO response 266.

The activation acknowledgment 314 may further include a PB acknowledgment list (or ACK_PB_LIST) and a PB negative acknowledgment list (or NACK_PB_LIST), similar to the REFRESH acknowledgment 290. The PB acknowledgment list of the activation acknowledgment 314 may contain the PBs whose PB state exists on the SLAVE side 274 (i.e., the ingress pipeline 192) and whose PB status is conducive for activation. This may include the PBs that are ready for activation and for which a cross-connection has been created and one or more upstream control dependency has been met.

The PB negative acknowledgment list of the activation acknowledgment 314 may contain the PBs whose PB state does not exist on the SLAVE side 274 (i.e., the ingress pipeline 192) or whose PB status is not conducive for activation. This may include the PBs that are not ready for activation or for which a cross-connection has not been created or an upstream control dependency has not been met.

In some embodiments, if the MASTER side 278 of the optical link 270 (i.e., the egress pipeline 194) does not receive the activation acknowledgment 314 within a predetermined time period (referred to as ACT_ACK_TIMEOUT), the egress pipeline 194 may re-attempt transmission of the activation request 310. After a predetermined number of unsuccessful consecutive attempts (referred to as ACT_MAX_RETRIES), the egress pipeline 194 may abandon transmitting the activation request 310.

Responsive to the egress pipeline 194 abandoning the activation request 310 or one or more PBs being contained in the PB negative acknowledgment list of a received activation acknowledgment 314, the OCP 182 may start a timer with a predetermined duration (referred to as CMN_AGG_TIMER) and begin a new activation sequence 306. Further, each of the PBs (or the one or more PBs contained in the PB negative acknowledgment list if an activation acknowledgment 314 was received) may be added to a PB pending list to be added to the next activation request 310 to re-attempt the activation.

Responsive to determining that there has been a change in one of the PB statuses, the SLAVE side 274 of the optical link 270 (i.e., the ingress pipeline 192) may generate an activation status message 318 and transmit the activation status message 318 upstream. The activation status message 318 may be one of an in-progress activation status message, which may indicate that the activation request 310 has been sent further downstream, a completed status message, which may indicate that the activation request 310 has been completed by the tail-end network element 14h, and the failed status, which may indicate that a downstream network element 14 was unable to transmit the activation request 310 downstream.

In some embodiments, the MASTER side 278 of an optical link 270 (i.e., the egress pipeline 194) may generate an activation status acknowledgment (or STATUS_ACK) 322 in response to receiving the activation status message 318. The SLAVE side 274 of the optical link 270 (i.e., the ingress pipeline 192), upon transmitting the activation status message 318, may start a timer with a predetermined duration (referred to as STATUS_ACK_TIMEOUT). If the ingress pipeline 192 does not receive an activation status acknowledgment 322 before the timer elapses, the ingress pipeline 192 may re-attempt transmitting the activation status message 318. After a predetermined number of unsuccessful consecutive attempts (referred to as STATUS_MAX_RETRIES), the ingress pipeline 192 may abandon transmitting the activation status message 318. In such a scenario, the OCP 182 may wait for the next REFRESH interval 294 to determine the activation status.

A definition of an exemplary activation request 310 is contained in Table 11 below.

TABLE 11

ACTIVATION REQUEST TLV Definition.

| Type (2B) | Length (2B) | Value | Mandatory? | Description |
|---|---|---|---|---|
| DST_DIRECTION (37) | 2 | enum { INGRESS=0, EGRESS } | M | Should be set to INGRESS. |
| ACT_SEQ_NUMBER (38) | 4 | Unsigned Integer | M | An increasing number. |
| PB_LIST (39) | Variable | List of PB-IDs | M | List of PB-IDs. Each PB-ID is coded as 8 Byte Number. |

A definition of an exemplary activation acknowledgment 314 is contained in Table 12 below.

TABLE 12

ACTIVATION ACK TLV Definition.

| Type (2B) | Length (2B) | Value | Mandatory? | Description |
|---|---|---|---|---|
| DST_DIRECTION (37) | 2 | enum { INGRESS=0, EGRESS } | M | Should be set to EGRESS. |
| ACT_SEQ_NUMBER (38) | 4 | Unsigned Integer | M | ACT_SEQ_NUMBER received in the activation request 310 for which this activation acknowledgment 314 is being generated. |
| ACK_PB_LIST (40) | Variable | List of PB-IDs | O | List of ACKed PB-IDs. Each PB-ID is coded as 8 Byte Number. |
| NACK_PB_LIST (41) | Variable | List of PB-IDs | O | List of NACKed PB-IDs. Each PB-ID is coded as 8 Byte Number. |

A definition of an exemplary activation status message 318 is contained in Table 13 below.

TABLE 13

ACTIVATION STATUS TLV Definition.

| Type (2B) | Length (2B) | Value | Mandatory? | Description |
|---|---|---|---|---|
| DST_DIRECTION (37) | 2 | enum { INGRESS=0, EGRESS } | M | Should be set to EGRESS. |
| STATUS_SEQ_NUMBER (57) | 4 | Unsigned Integer | M | An increasing number. |
| INPG_PB_LIST (42) | Variable | List of PB-IDs | O | List of In-Progress PB-IDs. Each PB-ID is coded as 8 Byte Number. |
| COMPL_PB_LIST (43) | Variable | List of PB-IDs | O | List of Completed PB-IDs. Each PB-ID is coded as 8 Byte Number. |
| FAIL_PB_LIST (44) | Variable | List of PB-IDs | O | List of Failed PB-IDs. Each PB-ID is coded as 8 Byte Number. |

Figure 12:
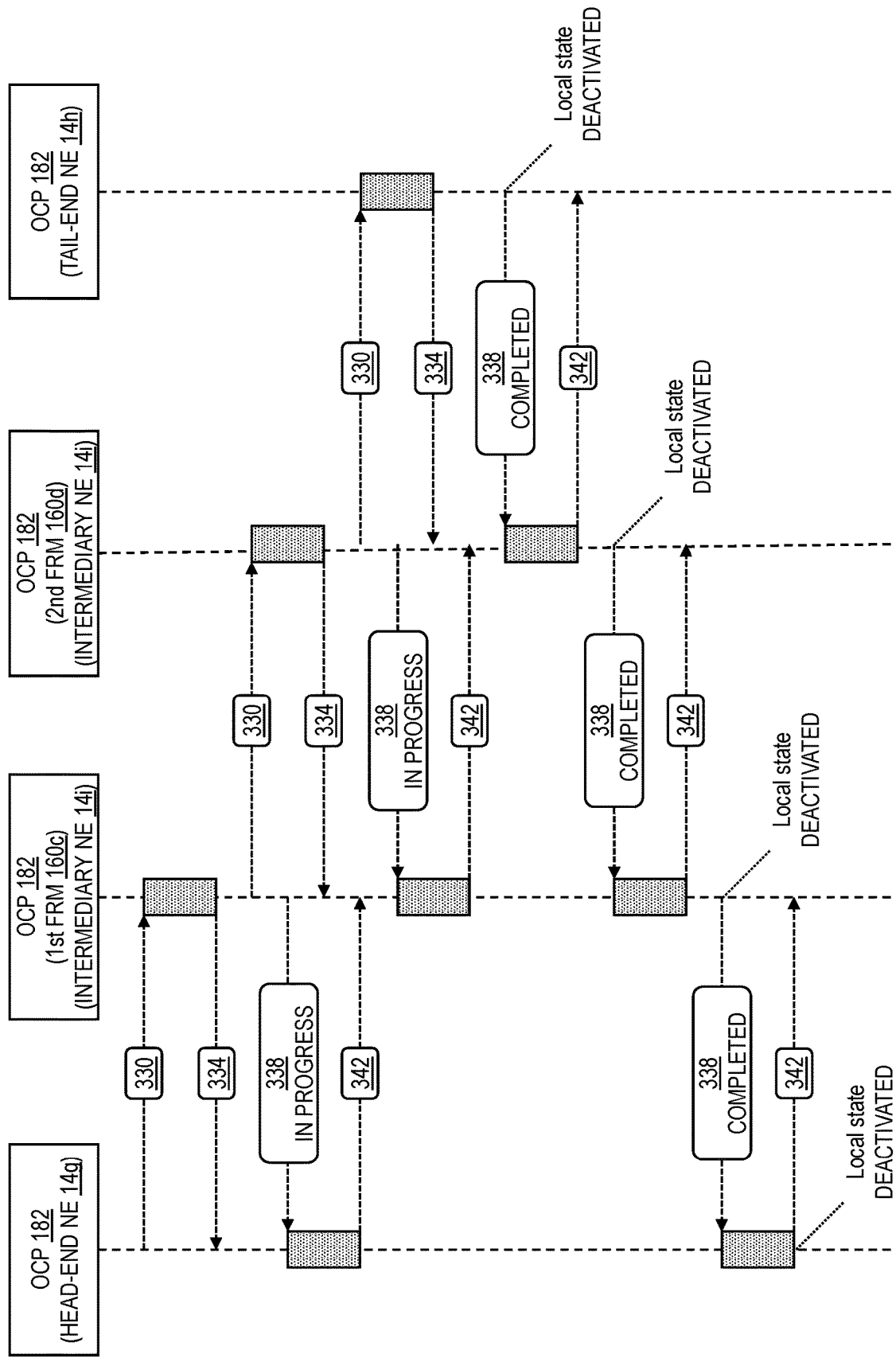
FIG. 12 is a sequence diagram of an exemplary embodiment of a deactivation sequence for a plurality of network elements connected in a series constructed in accordance with the present disclosure.

Referring now to FIG. 12, shown therein is a sequence diagram of an exemplary embodiment of a deactivation sequence 326 for deactivating a plurality of network elements 14 connected in a series constructed in accordance with the present disclosure. As shown in FIG. 12, a transport network 10 may comprise a head-end network element 14g, a tail-end network element 14h, and an express network element 14i comprising a first FRM 160c and a second FRM 160d, each of the network elements 14 connected to each other by one or more fiber optic line 22. The transport network 10 may further comprise one or more network element 14 in between each of the network elements 14 shown.

Deactivation may be performed in a unidirectional manner (e.g., from the tail-end network element 14h to the head-end network element 14g, from the express network element 14i to the tail-end network element 14h via the head-end network element 14g, or from the head-end network element 14g to the express network element 14i via the tail-end network element 14h). Types of PDUs which may be involved in the deactivation sequence 326 are a deactivation request 330 identifying one or more PB and being indicative of a request to deactivate the identified PBs on a plurality of optical interfaces 206, 210, or 218 of a plurality of network elements 14a-n connected in series, thereby disabling the plurality of optical interfaces 206, 210, or 218 from transporting the one or more optical carrier on the one or more PB on the fiber optic line 22, a deactivation acknowledgment 334 acknowledging receipt of the deactivation request 330, a deactivation status message 338 indicative of a current status of the deactivation sequence 326, and a deactivation status acknowledgment 342 for acknowledging receipt of the deactivation status message 338.

Deactivating a passband on an optical interface 206, 210, or 218 of a network element 14 may comprise deleting the cross-connection between the two WSS modules 70a-n of the network element 14 and adjusting, with the one or more optical power control loop, a configuration of the two WSS modules 70a-n.

In some embodiments, only the MASTER side 278 of an optical link 270 may generate a deactivation request 330. In some embodiments, in order for the deactivation request 330 to be generated, certain preconditions must be satisfied. These preconditions may include that the neighbor FSM 246 of the optical interface 206, 210, or 218 is in the UP state 250a and/or that the local state of one or more PB is in the AWAITING DOWNSTREAM DEACTIVATION state on the optical interface 206, 210, or 218.

In some embodiments, the SLAVE side 274 of the optical link 270 (i.e., the ingress pipeline 192) may receive the deactivation request 330. Responsive to receiving the deactivation request 330, the ingress pipeline 192 may verify that the PBs identified by the deactivation request 330 exist on the network element 14 (i.e., the express network element 14i) and that their state complies with the deactivation request 330 (i.e., is conducive to receiving and accepting the deactivation request 330). The ingress pipeline 192 may forward the deactivation request 330 to the orchestrator 248 of the network element 14 (i.e., the express network element 14i).

In some embodiments, the SLAVE side 274 of the optical link 270 (i.e., the ingress pipeline) may generate a deactivation acknowledgment 334 in response to receiving the deactivation request 330, the deactivation acknowledgment 334 being indicative of a current capacity of the optical interface 206, 210, or 218 to communicate via each of the one or more PB on the fiber optic line 22. The deactivation request 330 and the deactivation acknowledgment 334 may be correlated to each other using a deactivation sequence number (or DEACT_SEQ_NUM). Each deactivation request 330 may include a monotonically increasing deactivation sequence number, similar to the activation request 310. Each deactivation acknowledgment 334 may include the deactivation sequence number of the deactivation request 330 which it is acknowledging, similar to the activation acknowledgment 314.

The deactivation acknowledgment 334 may further include a PB acknowledgment list (or ACK_PB_LIST) and a PB negative acknowledgment list (or NACK_PB_LIST), similar to the activation acknowledgment 314. The PB acknowledgment list of the deactivation acknowledgment 334 may contain the PBs whose PB state exists on the SLAVE side 274 (i.e., the ingress pipeline 192) and whose PB status is conducive for deactivation. This may include the PBs that are activated and for which a cross-connection exists and the downstream deactivation status is completed (i.e., a completed deactivation status message 338 has been received).

The PB negative acknowledgment list of the deactivation acknowledgment 334 may contain the PBs whose PB state does not exist on the SLAVE side 274 (i.e., the ingress pipeline 192) or whose PB status is not conducive for deactivation. This may include the PBs that are not activated or for which a cross-connection does not exist or the downstream activation status is not completed (i.e., a completed deactivation status message 338 has not been received).

In some embodiments, if the MASTER side 278 of the optical link 270 (i.e., the egress pipeline 194) does not receive the deactivation acknowledgment 334 within a predetermined time period (referred to as DEACT_ACK_TIMEOUT), the egress pipeline 194 may re-attempt transmission of the deactivation request 330. After a predetermined number of unsuccessful consecutive attempts (referred to as DEACT_MAX_RETRIES), the egress pipeline 192 may abandon transmitting the deactivation request 330.

Responsive to the egress pipeline 192 abandoning the deactivation request 330, the OCP 182 may start a timer with a predetermined duration (referred to as CMN_AGG_TIMER) and begin a new deactivation sequence 326. Further, each of the PBs (or the one or more PBs contained in the PB negative acknowledgment list if a deactivation acknowledgment 334 was received) may be added to a PB pending list to be added to the next deactivation request 330 to re-attempt the deactivation.

Responsive to determining that there has been a change in one of the PB statuses, the SLAVE side 274 of the optical link 270 (i.e., the ingress pipeline 192) may generate a deactivation status message 338 and transmit the deactivation status message 338 upstream. The deactivation status message 338 may be one of an in-progress deactivation status message, which may indicate that the deactivation request 310 has been sent further downstream, a completed deactivation status message, which may indicate that the deactivation request 330 has been completed by the tail-end network element 14h up to the network element 14 that send the deactivation status message 338, and the failed deactivation status, which may indicate that a downstream network element 14 was unable to transmit the deactivation request 330 downstream.

In some embodiments, the MASTER side 278 of an optical link 270 (i.e., the egress pipeline 194) may generate a deactivation status acknowledgment (or STATUS_ACK) 342 in response to receiving the deactivation status message 338. The SLAVE side 274 of the optical link 270 (i.e., the ingress pipeline 192), upon transmitting the deactivation status message 338, may start a timer with a predetermined duration (referred to as STATUS_ACK_TIMEOUT). If the ingress pipeline 192 does not receive a deactivation status acknowledgment 342 before the timer elapses, the ingress pipeline 192 may re-attempt transmitting the deactivation status message 338. After a predetermined number of unsuccessful consecutive attempts (referred to as STATUS_MAX_RETRIES), the ingress pipeline 192 may abandon transmitting the deactivation status message 338. In such a scenario, the OCP 182 may wait for the next REFRESH interval 294 to determine the deactivation status.

A definition of an exemplary deactivation request 330 is contained in Table 14 below.

TABLE 14

DEACTIVATION REQUEST TLV Definition.

| Type (2B) | Length (2B) | Value | Mandatory? | Description |
|---|---|---|---|---|
| DST_DIRECTION (37) | 2 | enum { INGRESS=0, EGRESS } | M | Will be coded as INGRESS. |
| DEACT_SEQ_NUMBER (45) | 4 | Unsigned Integer | M | An increasing number |
| PB_LIST (39) | Variable | List of PB-IDs | M | List of PB-IDs. Each PB-ID is coded as 8 Byte Number. |

A definition of an exemplary deactivation acknowledgment 334 is contained in Table 15 below.

TABLE 15

DEACTIVATION ACK TLV Definition.

| Type (2B) | Length (2B) | Value | Mandatory? | Description |
|---|---|---|---|---|
| DST_DIRECTION (37) | 2 | enum { INGRESS=0, EGRESS } | M | Should be set to EGRESS. |
| DEACT_SEQ_NUMBER (45) | 4 | Unsigned Integer | M | DEACT_SEQ_NUMBER received in the deactivation request 330 for which this deactivation acknowledgment 334 is being generated. |
| ACK_PB_LIST (40) | Variable | List of PB-IDs | O | List of ACKed PB-IDs. Each PB-ID is coded as 8 Byte Number. |

A definition of an exemplary deactivation status message 338 is contained in Table 16 below.

TABLE 16

| Type (2B) | Length (2B) | Value | Mandatory? | Description |
|---|---|---|---|---|
| DST_DIRECTION (37) | 2 | enum { INGRESS=0, EGRESS } | M | Should be set to EGRESS. |
| STATUS_SEQ_NUMBER (57) | 4 | Unsigned Integer | M | An increasing number. |
| INPG_PB_LIST (42) | Variable | List of PB-IDs | O | List of In-Progress PB-IDs. Each PB-ID is coded as 8 Byte Number. |
| COMPL_PB_LIST (43) | Variable | List of PB-IDs | O | List of Completed PB-IDs. Each PB-ID is coded as 8 Byte Number. |
| FAIL_PB_LIST (44) | Variable | List of PB-IDs | O | List of Failed PB-IDs. Each PB-ID is coded as 8 Byte Number. |

A definition of an exemplary status acknowledgment (either of an activation status acknowledgment 322 or a deactivation status acknowledgment 342) is contained in Table 17 below.

TABLE 17

STATUS ACK TLV Definition.

| Type (2B) | Length (2B) | Value | Mandatory? | Description |
|---|---|---|---|---|
| STATUS_TYPE (56) | 2 | enum { ACTIVATION, DEACTIVATION } | M | Acknowledgment being generated for last activation status message 318 or last deactivation status message 338. |
| STATUS_SEQ_NUMBER (57) | 4 | Unsigned Integer | M | Sequence Number of the activation status message 318 or deactivation status message 338 for which this acknowledgment is generated. |

Figure 13:
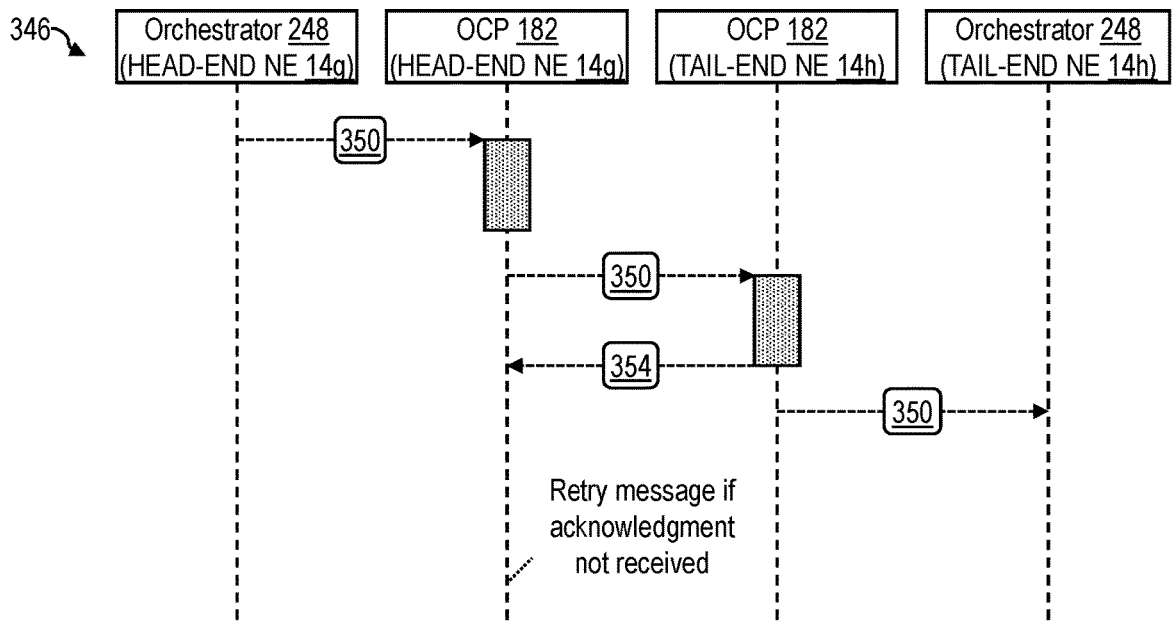
FIG. 13 is a sequence diagram of an exemplary embodiment of a generic messaging sequence constructed in accordance with the present disclosure.

Referring now to FIG. 13, shown therein is a sequence diagram of an exemplary embodiment of a generic message sequence 346 constructed in accordance with the present disclosure. Types of PDUs which may be involved in the generic message sequence 346 are a generic message 350 and a generic acknowledgment 354. The generic message 350 may be one of a generic notification indicative of an occurrence of an event and a generic action indicative of a request for an orchestrator 248 to perform an action. The OCP 182 may serve as a transporter for the generic messages 350 and generic acknowledgments 354. The generic acknowledgment 354 may acknowledge receipt of a generic message 350 (i.e., a generic notification or a generic action).

Either of the SLAVE side 274 (i.e., the ingress pipeline 192) and the MASTER side 278 (i.e., the egress pipeline 194) of an optical link 270 may generate the generic message 350 and the generic acknowledgment 354. In some embodiments, either of the SLAVE side 274 (i.e., the ingress pipeline 192) and the MASTER side 278 (i.e., the egress pipeline 194) of an optical link 270 may generate a generic acknowledgment 354 in response to receiving the generic message 350.

The generic message 350 and the generic acknowledgment 354 may be correlated to each other using a generic sequence number (or NOTIF_SEQ_NUM for generic notifications and ACTION_SEQ_NUM for generic actions). Each generic message 350 may include a monotonically increasing generic sequence number, similar to the activation request 310. Each generic acknowledgment 354 may include the generic sequence number of the generic message 350 which it is acknowledging, similar to the activation acknowledgment 314.

In some embodiments, if either of the SLAVE side 274 (i.e., the ingress pipeline 192) and the MASTER side 278 (i.e., the egress pipeline 194) of an optical link 270 does not receive the generic acknowledgment 354 within a predetermined time period (referred to as NOTIF_ACK_TIMEOUT for generic notifications and ACTION_ACK_TIMEOUT for generic actions), either of the ingress pipeline 192 and the egress pipeline 194 may re-attempt transmission of the generic message 350.

In some embodiments, after a predetermined number of unsuccessful consecutive attempts (referred to as NOTIF_MAX_RETRIES for generic notifications and ACTION_MAX_RETRIES for generic actions), the OCP 182 may discard to generic message 350 and inform the local orchestrator 248 of the failure to deliver the generic message 350. If the generic message 350 has been generated by the local orchestrator 248, then the OCP 182 may abandon delivering the generic message 350 until a later point in time. If the generic message 350 has been generated by the OCP 182, however, the next step taken by the OCP 182 may depend on whether the generic message 350 is a state-oriented message (discussed further below) or a best-effort message (discussed further below).

If the generic message 350 generated by the OCP 182 is state-oriented (discussed further below), after the predetermined number of unsuccessful consecutive attempts, either of the ingress pipeline 192 and the egress pipeline 194 may start the timer with the predetermined duration (i.e., CMN_AGG_TIMER) (if the timer is not already running). Responsive to the timer elapsing, either of the ingress pipeline 192 and the egress pipeline 194 may re-attempt transmission of the generic message 350. This may continue until the next REFRESH Interval 294. If the generic message 350 originated by the OCP 182 is a best-effort message (discussed further below), however, after the predetermined number of unsuccessful consecutive attempts, the OCP 182 may simply ignore the failed transmission.

Each generic message 350 may further include a generic type (or notification type for generic notifications or action type for generic actions) and generic data (or notification data for generic notifications or action data for generic actions). Responsive to receiving a generic message 350, the OCP 182 may process the generic message 350 and forward the generic message 350 to the local orchestrator 248. Processing the generic message 350 may include checking a format of the generic message 350 to determine whether the format of the generic message 350 complies with the specifications of the OCP 182 and checking the generic type of the generic message 250 to determine whether the generic type is valid (i.e., is a notification type or an action type).

In some embodiments, generic messages 350 of a particular generic type may be reserved for the OCP's 182 internal use. That is, the OCP 182 may generate the generic messages 350 and consume the generic messages 350 of this particular generic type. For such generic messages 350 generated by the OCP 182, the predetermined time period (i.e., NOTIF_ACK_TIMEOUT or ACTION_ACK_TIMEOUT) and the predetermined number of unsuccessful consecutive attempts (i.e., NOTIF_MAX_RETRIES or ACTION_MAX_RETRIES) may align the with the predetermined time period and the predetermined number of unsuccessful consecutive attempts for generic messages 350 generated by the orchestrator 248.

Responsive to a PB state of a PB on the egress pipeline 194 transitioning to a FAULTED state, the egress pipeline 194 may generate a generic message 350 (i.e., a generic notification) of generic type (i.e., notification type) PB_FAULTED_NOTIFICATION and having generic data containing a list of the PBs whose PB state has transitioned to the FAULTED state. Such generic message 350 may be a state-oriented message. A receiving ingress pipeline 192 of a neighboring network element 14*f* may store data indicative of the FAULTED state of the PBs, transmit a generic acknowledgment 354 in response, and forward the generic message 350 to the local orchestrator 248.

Responsive to a PB being instantiated on the ingress pipeline 192, the ingress pipeline 192 may generate a generic message (i.e., a generic notification) of generic type (i.e., notification type) PB_CREATE_NOTIFICATION and having generic data containing a list of the newly created PBs. Such generic message 350 may be a best-effort message. A receiving egress pipeline 194 of a neighboring network element 14*f* may transmit a generic acknowledgment 354 in response and re-attempt transmission of any activation request 310 or generic message 350 pending against the newly created PBs.

A definition of an exemplary generic message 350 (i.e., a generic notification) is contained in Table 18 below.

TABLE 18

| | | | | |
|---|---|---|---|---|
| GENERIC NOTIFICATION TLV Definition. | | | | |
| Type (2B) | Length (2B) | Value | Mandatory? | Description |
| DST_DIRECTION (37) | 2 | enum { INGRESS=0, EGRESS } | M | Can be INGRESS or EGRESS. |
| NOTIF_SEQ_NUM (46) | 4 | Unsigned Integer | M | An increasing number. |
| GEN_NOTIF_TYPE (47) | 4 | Unsigned Integer | M | Generic notification type. 0: Invalid Notification Type 1: PB Faulted Notification 2: PB Create Notification 3 to 64: Reserved for OCP's Internal Use. 65 to $2^{32}$: Opaque types used by the orchestrator 248. |
| GEN_NOTIF_DATA (48) | Variable | Opaque data | O | |

A definition of an exemplary generic acknowledgment 354 (i.e., a notification acknowledgment) is contained in Table 19 below.

TABLE 19

| | | | | |
|---|---|---|---|---|
| GENERIC NOTIFICATION ACK TLV Definition. | | | | |
| Type (2B) | Length (2B) | Value | Mandatory? | Description |
| DST_DIRECTION (37) | 2 | enum { INGRESS=0, EGRESS } | M | Can be INGRESS or EGRESS. |
| NOTIF_SEQ_NUM (46) | 4 | Unsigned Integer | M | NOTIF_SEQ_NUM received in the generic message 350 for which this generic acknowledgment 354 is being generated. |

A definition of an exemplary generic message 350 (i.e., a generic action) is contained in Table 20 below.

TABLE 20

| | | | | |
|---|---|---|---|---|
| GENERIC ACTION TLV Definition. | | | | |
| Type (2B) | Length (2B) | Value | Mandatory? | Description |
| DST_DIRECTION (37) | 2 | enum { INGRESS=0, | M | Can be INGRESS or EGRESS. |

TABLE 20-continued

GENERIC ACTION TLV Definition.

| Type (2B) | Length (2B) | Value | Mandatory? | Description |
|---|---|---|---|---|
| | | EGRESS } | | |
| ACTION_SEQ_NUM (49) | 4 | Unsigned Integer | M | An increasing number. |
| GEN_ACTION_TYPE (50) | 4 | Unsigned Integer | M | Generic action type. 0: Invalid Action Type 1 to 64: Reserved for OCP's Internal Use. 65 to $2^{32}$: Opaque types used by the orchestrator 248. |
| GEN_ACTION_DATA (51) | Variable | Hexa-decimal String | O | Opaque data |

A definition of an exemplary generic acknowledgment 354 (i.e., an action acknowledgment) is contained in Table 21 below.

TABLE 21

GENERIC ACTION ACK TLV Definition

| Type (2B) | Length (2B) | Value | Mandatory? | Description |
|---|---|---|---|---|
| DST_DIRECTION (37) | 2 | enum { INGRESS=0, EGRESS } | M | Can be INGRESS or EGRESS. |
| ACTION_SEQ_NUM (49) | 4 | Unsigned Integer | M | ACTION_SEQ_NUM received in the generic message 350 for which this generic acknowledgment 354 is being generated. |

In some embodiments, when multiple PB states, statuses, actions, and/or notifications are pending, the OCP 182 may generate the generic messages 350 in a priority order as follows. For the ingress pipeline 192: first, orchestrator actions; second, orchestrator notifications; third, deactivation status messages 338; fourth, activation status messages 318; and fifth, service creation notifications. For the egress pipeline 194: first, fault state notifications; second, orchestrator actions; third, orchestrator notifications; fourth, deactivation requests 330; and fifth, activation requests 310.

Figure 14A:
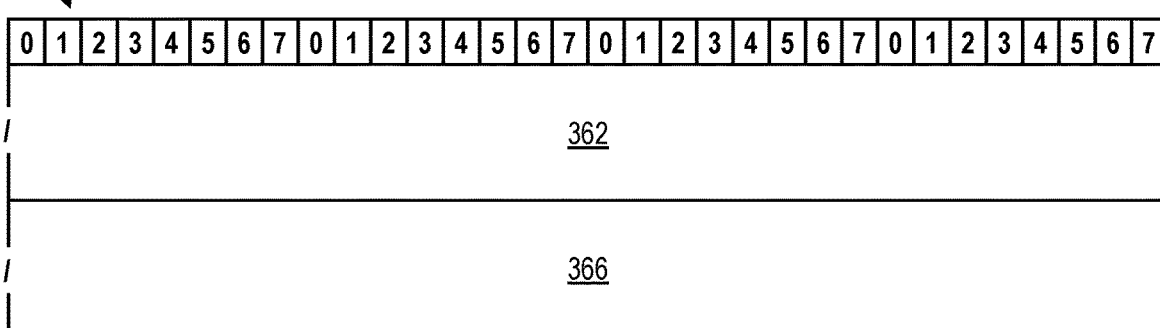
FIG. 14A is a binary string representation of an exemplary embodiment of a PDU format constructed in accordance with the present disclosure.

Referring now to FIG. 14A, shown therein is a binary string representation of an exemplary embodiment of a common format 358 constructed in accordance with the present disclosure. Each of the PDUs described herein may be in the common format 358 shown in FIG. 14A. The common format 358 may comprise a common header 362 and a top-level Type-Length-Value (TLV) 366. The common header 362 may be 48 bytes in length. The top-level TLV 366 may be variable in length.

Figure 14B:
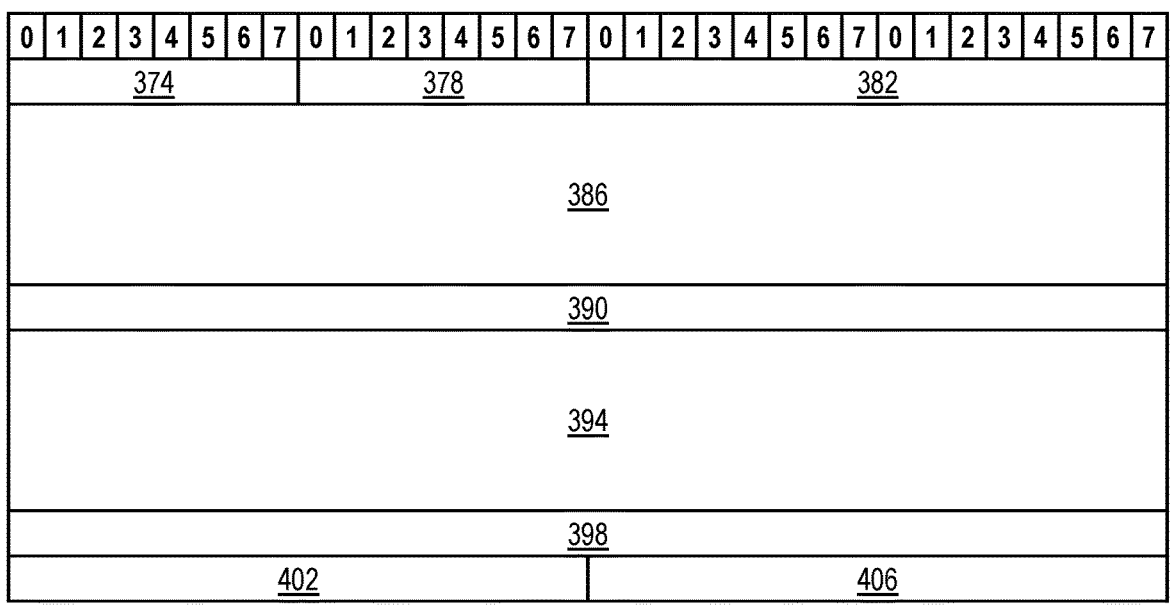
FIG. 14B is a binary string representation of an exemplary embodiment of a PDU header format constructed in accordance with the present disclosure.

Referring now to FIG. 14B, shown therein is a binary string representation of an exemplary embodiment of a common header format 370 constructed in accordance with the present disclosure. Each of the PDUs described herein may have a common header 362 in the common header format 370 shown in FIG. 14B. The common header format 370 may comprise a version 374, a type 378, a length 382, a destination node identifier 386, a destination optical interface index 390, a source node identifier 394, a source optical interface index 398, a sequence number 402, and a reserved space 406. The version 375 and the type 378 may be 1 byte in length. The length 382, the sequence number 402, and the reserved space 406 may be 2 bytes in length. The destination node identifier 386 and the source node identifier 394 may be 16 bytes in length. The destination optical interface index 390 and the source optical interface index 398 may be 4 bytes in length.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An optical network, comprising:
    a fiber optic line;
    a head-end network element comprising a first optical interface coupled to the fiber optic line, a first processor, and a first non-transitory computer readable medium storing first processor-executable instructions that, when executed by the first processor, cause the first processor to:
        activate one or more passband on the first optical interface, thereby enabling the first optical interface to transport one or more optical carrier on the one or more passband on the fiber optic line; and
        transmit, via the first optical interface, an activation request downstream on the fiber optic line, the activation request identifying the one or more passband and being indicative of a request to activate the one or more passband on a plurality of optical interfaces of a plurality of network elements connected in series, thereby enabling the plurality of network elements to transport the one or more optical carrier on the one or more passband on the fiber optic line; and a tail-end network element downstream from the head-end network element on the fiber optic line, the tail-end network element comprising a second optical interface coupled to the fiber optic line, a second processor, and a second non-transitory computer readable medium storing second processor-executable instructions that, when executed by the second processor, cause the second processor to:
receive, via the second optical interface, the activation request from upstream on the fiber optic line; and
activate the one or more passband on the second optical interface, thereby enabling the second optical interface to transport the one or more optical carrier on the one or more passband on the fiber optic line.

2. The optical network of claim 1, wherein the second processor-executable instructions, when executed by the second processor, further cause the second processor to, responsive to receiving the activation request, transmit, via the second optical interface, an activation acknowledgment upstream on the fiber optic line, the activation acknowledgment being indicative of a current capacity of the second optical interface to transport the one or more optical carrier on each of the one or more passband on the fiber optic line.

3. The optical network of claim 1, wherein the second processor-executable instructions, when executed by the second processor, further cause the second processor to transmit, via the second optical interface, a completed activation status upstream on the fiber optic line, the completed activation status being indicative of a completion of the activation request by the tail-end network element, and wherein the first processor-executable instructions, when executed by the first processor, further cause the first processor to receive, via the first optical interface, the completed activation status from downstream on the fiber optic line.

4. The optical network of claim 3, wherein the first processor-executable instructions, when executed by the first processor, further cause the first processor to, responsive to receiving the completed activation status, transmit, via the first optical interface, a status acknowledgment downstream on the fiber optic line, the status acknowledgment being indicative of a current capacity of the first optical interface to transport the one or more optical carrier on each of the one or more passband on the fiber optic line.

5. The optical network of claim 1, further comprising an intermediary network element disposed between the head-end network element and the tail-end network element on the fiber optic line, the intermediary network element comprising a third optical interface coupled to the fiber optic line, a third processor, and a third non-transitory computer readable medium storing third processor-executable instructions that, when executed by the third processor, cause the third processor to:
receive, via the third optical interface, the activation request from upstream on the fiber optic line;
activate the one or more passband on the third optical interface, thereby enabling the third optical interface to transport the one or more optical carrier on the one or more passband on the fiber optic line; and
transmit, via the third optical interface, the activation request downstream on the fiber optic line.

6. The optical network of claim 5, wherein the third processor-executable instructions, when executed by the third processor, further cause the third processor to, responsive to receiving the activation request, transmit, via the third optical interface, an activation acknowledgment upstream on the fiber optic line, the activation acknowledgment being indicative of a current capacity of the third optical interface to transport the one or more optical carrier on each of the one or more passband on the fiber optic line.

7. The optical network of claim 1, wherein the second processor-executable instructions, when executed by the second processor, further cause the second processor to transmit, via the second optical interface, a first completed activation status upstream on the fiber optic line, the first completed activation status being indicative of a completion of the activation request by the tail-end network element, the optical network further comprising an intermediary network element disposed between the head-end network element and the tail-end network element on the fiber optic line, the intermediary network element comprising a third optical interface, a third processor, and a third non-transitory computer readable medium storing third processor-executable instructions that, when executed by the third processor, cause the third processor to:
receive, via the third optical interface, the first completed activation status from downstream on the fiber optic line; and
transmit, via the third optical interface, a second completed activation status upstream on the fiber optic line, the second completed activation status being indicative of a completion of the activation request by the intermediary network element;
wherein the first processor-executable instructions, when executed by the first processor, further cause the first processor to receive, via the first optical interface, the second completed activation status from downstream on the fiber optic line.

8. The optical network of claim 7, wherein the third processor-executable instructions, when executed by the third processor, further cause the third processor to, responsive to receiving the first completed activation status, transmit, via the third optical interface, a status acknowledgment downstream on the fiber optic line, the status acknowledgment being indicative of a current capacity of the third optical interface to communicate via each of the one or more passband on the fiber optic line.

9. An optical network, comprising:
a fiber optic line;
a head-end network element comprising a first optical interface coupled to the fiber optic line, a first processor, and a first non-transitory computer readable medium storing first processor-executable instructions that, when executed by the first processor, cause the first processor to:
transmit, via the first optical interface, a deactivation request downstream on the fiber optic line, the deactivation request identifying one or more passband and being indicative of a request to deactivate the one or more passband on a plurality of optical interfaces of a plurality of network elements connected in series, thereby disabling the plurality of network elements from transporting one or more optical carrier on the one or more passband on the fiber optic line;

a tail-end network element downstream from the head-end network element on the fiber optic line, the tail-end network element comprising a second optical interface coupled to the fiber optic line, a second processor, and a second non-transitory computer readable medium storing second processor-executable instructions that, when executed by the second processor, cause the second processor to:
    receive, via the second optical interface, the deactivation request from upstream on the fiber optic line; and
    deactivate the one or more passband on the second optical interface, thereby disabling the second optical interface from transporting the one or more optical carrier on the one or more passband on the fiber optic line.

10. The optical network of claim 9, wherein the second processor-executable instructions, when executed by the second processor, further cause the second processor to, responsive to receiving the deactivation request, transmit, via the second optical interface, a deactivation acknowledgment upstream on the fiber optic line, the deactivation acknowledgment being indicative of a current capacity of the second optical interface to transport the one or more optical carrier on each of the one or more passband on the fiber optic line.

11. The optical network of claim 9, wherein the second processor-executable instructions, when executed by the second processor, further cause the second processor to transmit, via the second optical interface, a completed deactivation status upstream on the fiber optic line, the completed deactivation status being indicative of a completion of the deactivation request by the tail-end network element, and wherein the first processor-executable instructions, when executed by the first processor, further cause the first processor to:
    receive, via the first optical interface, the completed deactivation status from downstream on the fiber optic line; and
    deactivate the one or more passband on the first optical interface, thereby disabling the first optical interface from transporting the one or more optical carrier on the one or more passband on the fiber optic line.

12. The optical network of claim 11, wherein the first processor-executable instructions, when executed by the first processor, further cause the first processor to, responsive to receiving the completed deactivation status, transmit, via the first optical interface, a status acknowledgment downstream on the fiber optic line, the status acknowledgment being indicative of a current capacity of the first optical interface to transport the one or more optical carrier on each of the one or more passband on the fiber optic line.

13. The optical network of claim 9, further comprising an intermediary network element of the one or more network element downstream from the head-end network element on the fiber optic line, the intermediary network element disposed between the head-end network element and the tail-end network element, the intermediary network element comprising a third optical interface coupled to the fiber optic line, a third processor, and a third non-transitory computer readable medium storing third processor-executable instructions that, when executed by the third processor, cause the third processor to:
    receive, via the third optical interface, the deactivation request from upstream on the fiber optic line; and
    transmit, via the third optical interface, the deactivation request downstream on the fiber optic line.

14. The optical network of claim 13, wherein the third processor-executable instructions, when executed by the third processor, further cause the third processor to, responsive to receiving the deactivation request, transmit, via the third optical interface, a deactivation acknowledgment upstream on the fiber optic line, the deactivation acknowledgment being indicative of a current capacity of the third optical interface to transport the one or more optical carrier on each of the one or more passband on the fiber optic line.

15. The optical network of claim 9, wherein the second processor-executable instructions, when executed by the second processor, further cause the second processor to transmit, via the second optical interface, a first completed deactivation status upstream on the fiber optic line, the first completed deactivation status being indicative of a completion of the deactivation request by the tail-end network element, the optical network further comprising an intermediary network element disposed between the head-end network element and the tail-end network element on the fiber optic line, the intermediary network element comprising a third optical interface coupled to the fiber optic line, a third processor, and a third non-transitory computer readable medium storing third processor-executable instructions that, when executed by the third processor, cause the third processor to:
    receive, via the third optical interface, the first completed deactivation status from downstream on the fiber optic line;
    deactivate the one or more passband on the third optical interface, thereby disabling the third optical interface from transporting the one or more optical carrier on the one or more passband on the fiber optic line; and
    transmit, via the third optical interface, a second completed deactivation status upstream on the fiber optic line, the second completed deactivation status being indicative of a completion of the deactivation request by the intermediary network element;
wherein the first processor-executable instructions, when executed by the first processor, further cause the first processor to:
    receive, via the first optical interface, the second completed deactivation status from downstream on the fiber optic line; and
    deactivate the one or more passband on the first optical interface, thereby disabling the first optical interface from transporting the one or more optical carrier on the one or more passband on the fiber optic line.

16. The optical network of claim 15, wherein the third processor-executable instructions, when executed by the third processor, further cause the third processor to, responsive to receiving the first completed deactivation status, transmit, via the third optical interface, a status acknowledgment downstream on the fiber optic line, the status acknowledgment being indicative of a current capacity of the third optical interface to transport the one or more optical carrier on each of the one or more passband on the fiber optic line.

17. An optical network, comprising:
a fiber optic line; and
a first network element comprising a first optical interface coupled to the fiber optic line, a first processor, and a first non-transitory computer readable medium storing first processor-executable instructions that, when executed by the first processor, cause the first processor to:

transmit, via the first optical interface, a generic message to a second network element neighboring the first network element on the fiber optic line; and receive, via the first optical interface, a generic acknowledgment of the generic message from the second network element;

wherein the second network element comprises a second optical interface coupled to the fiber optic line, a second processor, and a second non-transitory computer readable medium storing second processor-executable instructions that, when executed by the second processor, cause the second processor to:

receive, via the second optical interface, the generic message from the first network element; and responsive to receiving the generic message, transmit, via the second optical interface, the generic acknowledgment of the generic message to the first network element.

18. The optical network of claim 17, wherein receiving the acknowledgment from the second network element further comprises:

Waiting a predetermined period of time to receive the generic acknowledgment of the generic message from the second network element; and responsive to the predetermined period of time elapsing without receiving the generic acknowledgment of the generic message, retransmitting, via the first optical interface, the generic message to the second network element.

19. The optical network of claim 17, wherein the message is indicative of the first optical interface being incapable of transporting one or more optical carrier on one or more passband on the fiber optic line, and transmitting the generic message to the second network element is further defined as, responsive to the first optical interface being incapable of transporting the one or more optical carrier on the one or more passband, transmitting, via the first optical interface, the generic message to the second network element.

20. The optical network of claim 19, wherein the generic message identifies the one or more passband.

* * * * *